United States Patent
Zhu et al.

(10) Patent No.: US 11,375,470 B2
(45) Date of Patent: Jun. 28, 2022

(54) NETWORK ASSISTED MULTI-SUBSCRIPTION PHYSICAL LAYER SHARING

(71) Applicant: Qualcomm Incorporated, San Diego, CA (US)

(72) Inventors: Xipeng Zhu, San Diego, CA (US); Ruiming Zheng, Beijing (CN); Xiaoxia Zhang, San Diego, CA (US); Xiaohui Liu, Beijing (CN); Gavin Bernard Horn, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 243 days.

(21) Appl. No.: 16/468,433

(22) PCT Filed: Jul. 12, 2017

(86) PCT No.: PCT/CN2017/092629
§ 371 (c)(1),
(2) Date: Jun. 11, 2019

(87) PCT Pub. No.: WO2018/141148
PCT Pub. Date: Aug. 9, 2018

(65) Prior Publication Data
US 2021/0282103 A1 Sep. 9, 2021

(30) Foreign Application Priority Data
Feb. 2, 2017 (WO) ................ PCT/CN2017/072801

(51) Int. Cl.
*H04W 60/00* (2009.01)
*H04W 76/15* (2018.01)
(Continued)

(52) U.S. Cl.
CPC ........ *H04W 60/005* (2013.01); *H04W 8/183* (2013.01); *H04W 24/10* (2013.01); *H04W 76/15* (2018.02); *H04W 88/06* (2013.01)

(58) Field of Classification Search
CPC ..... H04W 48/18; H04W 76/12; H04W 76/28; H04W 28/06; H04W 8/183;
(Continued)

(56) References Cited

U.S. PATENT DOCUMENTS 8,718,031 B2* 5/2014 Hu ................ H04W 76/15
370/341
9,305,597 B2* 4/2016 Abhijeet ........ H04N 21/23116
(Continued)

FOREIGN PATENT DOCUMENTS

CN 102469116 A * 12/2013
DE 19823074 A1 11/1999
(Continued)

OTHER PUBLICATIONS

IEEE Recommended Practice for Network Reference Model and Functional Description of IEEE 802(R) Access Network Published in: IEEE Std 802.1CF-2019 (pp. 1-185) May 2019 (Year: 2019).*
(Continued)

*Primary Examiner* — William D Cumming
(74) *Attorney, Agent, or Firm* — Holland & Hart LLP

(57) ABSTRACT

Techniques are described that provide network assisted multi-subscription physical layer sharing at a user equipment (UE) by transmitting a multi-subscription coordination capability to a network, establishing a link for a first subscription with the network based on the multi-subscription coordination capability, and establishing a second subscription with the network using the link based on the multi-subscription coordination capability, the first subscription is associated with the second subscription.

29 Claims, 21 Drawing Sheets

(51) Int. Cl.
*H04W 8/18* (2009.01)
*H04W 24/10* (2009.01)
*H04W 88/06* (2009.01)

(58) Field of Classification Search
CPC . H04W 36/0066; H04W 48/10; H04W 48/16; H04W 4/90; H04W 36/0022; H04W 76/15; H04W 36/28; H04W 68/005; H04W 60/005; H04W 88/06
USPC .... 370/329, 328, 341; 455/435.1, 45, 552.1, 455/458
See application file for complete search history.

(56) References Cited

U.S. PATENT DOCUMENTS

| | | | |
|---|---|---|---|
| 9,319,977 B2 | 4/2016 | Nayak et al. | |
| 9,330,241 B2* | 5/2016 | Abhijeet | H04L 65/604 |
| 9,413,393 B2* | 8/2016 | Grube | G06F 11/1076 |
| 9,781,761 B2* | 10/2017 | Adjakple | H04W 36/28 |
| 9,860,790 B2* | 1/2018 | Khan | H04L 45/308 |
| 10,289,505 B2* | 5/2019 | Gladwin | H04L 69/40 |
| 10,433,359 B2* | 10/2019 | Adjakple | H04W 72/0486 |
| 10,798,761 B2* | 10/2020 | Baek | H04W 76/15 |
| 10,834,661 B2* | 11/2020 | Joseph | H04W 76/11 |
| 11,039,297 B1* | 6/2021 | Desai | H04W 48/18 |
| 2012/0190362 A1* | 7/2012 | Subbarayudu | H04W 76/28 455/435.1 |
| 2012/0250616 A1* | 10/2012 | Hu | H04W 76/15 370/328 |
| 2013/0016696 A1* | 1/2013 | Adjakple | H04W 36/28 370/328 |
| 2013/0150036 A1 | 6/2013 | Pattaswamy et al. | |
| 2013/0157662 A1 | 6/2013 | Han et al. | |
| 2014/0274047 A1* | 9/2014 | Dhanda | H04W 68/005 455/458 |
| 2014/0328573 A1* | 11/2014 | Abhijeet | H04L 9/0894 386/263 |
| 2014/0331103 A1* | 11/2014 | Grube | H04N 21/23116 714/763 |
| 2014/0331330 A1* | 11/2014 | Abhijeet | G06F 21/10 726/26 |
| 2014/0370892 A1* | 12/2014 | Gottimukkala | H04W 60/005 455/435.1 |
| 2014/0372607 A1* | 12/2014 | Gladwin | G06F 3/0617 709/224 |
| 2015/0050952 A1 | 2/2015 | Ponukumati | |
| 2015/0065106 A1 | 3/2015 | Catovic et al. | |
| 2015/0099528 A1 | 4/2015 | Hu et al. | |
| 2015/0119103 A1* | 4/2015 | Ngai | H04W 88/06 455/552.1 |
| 2016/0073404 A1* | 3/2016 | Vutukuri | H04W 36/0066 370/329 |
| 2016/0105864 A1 | 4/2016 | Guo | |
| 2016/0295541 A1* | 10/2016 | Jaiswal | H04W 48/16 |
| 2016/0301790 A1 | 10/2016 | Kanamarlapudi et al. | |
| 2016/0314052 A1* | 10/2016 | Gladwin | H04L 69/40 |
| 2017/0048854 A1* | 2/2017 | Anand | H04W 72/0453 |
| 2017/0332272 A1* | 11/2017 | Adjakple | H04W 36/28 |
| 2018/0359795 A1* | 12/2018 | Baek | H04W 76/12 |
| 2019/0335379 A1* | 10/2019 | Joseph | H04L 1/189 |
| 2019/0342761 A1* | 11/2019 | Yu | H04W 48/16 |
| 2020/0351818 A1* | 11/2020 | Park | H04W 68/02 |
| 2020/0374951 A1* | 11/2020 | Yao | H04W 76/11 |
| 2020/0404481 A1* | 12/2020 | Zong | H04W 8/186 |
| 2021/0282103 A1* | 9/2021 | Zhu | H04W 8/183 |

FOREIGN PATENT DOCUMENTS

| | | | | |
|---|---|---|---|---|
| JP | 2002095038 A | 3/2002 | | |
| WO | WO-9962282 A1 | 12/1999 | | |
| WO | 2011109750 A1 | 9/2011 | | |
| WO | WO-2014150592 A2 * | 9/2014 | | H04W 40/02 |
| WO | WO-2014150592 A3 * | 12/2014 | | H04W 40/02 |
| WO | WO-2014201657 A1 | 12/2014 | | |
| WO | WO-2015050889 A1 | 4/2015 | | |
| WO | WO 2015/116599 A1 | 8/2015 | | |
| WO | WO 9015/196842 A1 | 8/2015 | | |
| WO | WO-2015148711 | 10/2015 | | |
| WO | WO-2015168029 A1 | 11/2015 | | |
| WO | WO-2020089707 A1 * | 5/2020 | | H04L 67/00 |

OTHER PUBLICATIONS

R. Maallawi, N. Agoulmine, B. Radier and T. Ben Meriem, "A Comprehensive Survey on Offload Techniques and Management in Wireless Access and Core Networks," in IEEE Communications Surveys & Tutorials, vol. 17, No. 3, pp. 1582-1604, thirdquarter 2015, doi: 10.1109/COMST.2014.2373356. Nov. 2014 (Year: 2014).*
V. Yazici, U. C. Kozat and M. O. Sunay, "A new control plane for 5G network architecture with a case study on unified handoff, mobility, and routing management," in IEEE Communications Magazine, vol. 52, No. 11, pp. 76-85, Nov. 2014, doi: 10.1109/MCOM.2014.6957146. (Year: 2014).*
H. Wei, Z. Zhang and B. Fan, "Network slice access selection scheme in 5G," 2017 IEEE 2nd Information Technology, Networking, Electronic and Automation Control Conference (ITNEC), Dec. 2017, pp. 352-356, doi: 10.1109/ITNEC.2017.8284751. (Year: 2017).*
International Search Report and Written Opinion—PCT/CN2017/072801—ISA/EPO—dated Nov. 7, 2017.
International Search Report and Written Opinion—PCT/CN2017/092629—ISA/EPO—dated Sep. 26, 2017.
Ericsson: "Dual-SIM Dual-Standby UEs and their Impact on the RAN", 3GPP Draft, R2-115375 Dual-Sim Dual-Standby Use and their Impact on the Ran, 3rd Generation Partnership Project (3GPP), Mobile Competence Centre, 650, Route Des Lucioles, F-06921 Sophia-Antipolis Cedex, France, vol. RAN WG2, No. Zhuhai, Oct. 10, 2011, Oct. 3, 2011 (Oct. 3, 2011), XP050540879, pp. 1-3, [retrieved on Oct. 3, 2011].
Qualcomm Incorporated: "Solution X for Key Issue 4 on Session Management", SA WG2 Meeting #114, S2-161494, Apr. 11-15, 2016, Sophia Antipolis, France, 11 Pages, URL: https://www.3gpp.org/ftp/tsg_sa/WG2_Arch/TSGS2_114_Sophia_Antipolis/Docs/S2-161494.zip.
Qualcomm Incorporated: "SMARTER: Use Case for Multiple Services with Different Subscriptions", 3GPP Draft, 3GPP TSG-SA WG1 Ad-hoc on SMARTER (5G), S1-153075, SMARTER: Use Case for Multiple Services with Different Subcriptions, 3rd Generation Partnership Project (3GPP), Mobile Competence Centre, 650, Route Des Lucioles, F-06921 Sophia-Antipolis Cedex, France, vol. RAN WG1, No. Vancouver, Canada, Oct. 19, 2015-Oct. 21, 2015, Oct. 9, 2015 (Oct. 9, 2015), XP051033830, 3 pages, Retrieved from the Internet.
Supplementary European Search Report—EP17894913—Search Authority—Munich—dated Oct. 7, 2020.

* cited by examiner

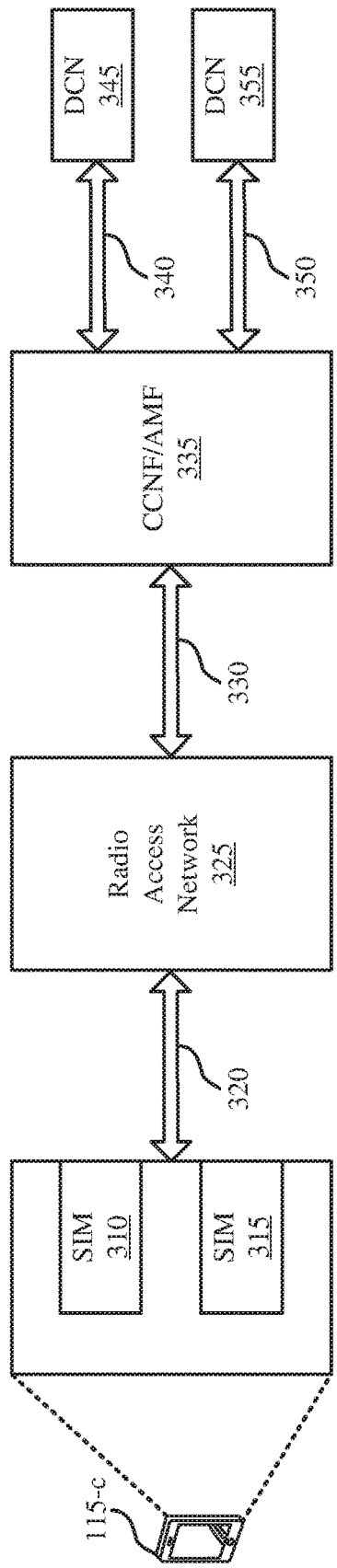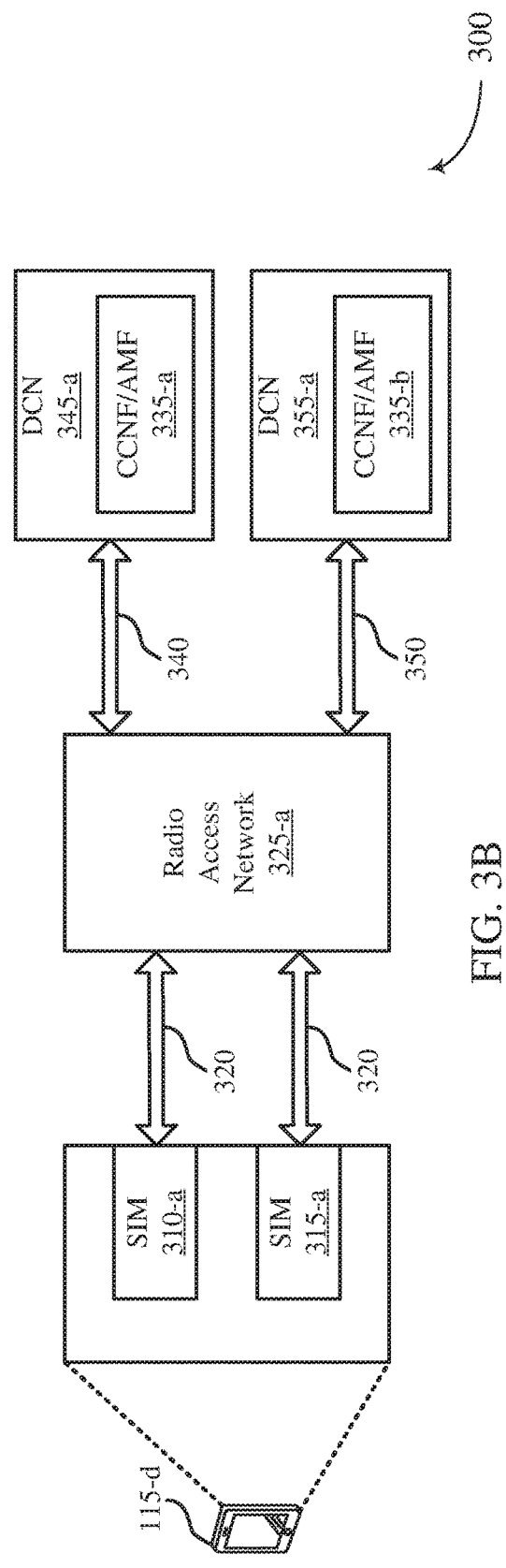
FIG. 3A
FIG. 3B

NETWORK ASSISTED MULTI-SUBSCRIPTION PHYSICAL LAYER SHARING

CROSS REFERENCES

This application is a 371 national phase filing of international Application No, PCT/CN2017/092629 by Zhu et al., entitled "NETWORK ASSISTED MULTISUBSCRIPTION PHYSICAL LAYER SHARING", filed Jul. 12, 2017, which claims priority to Chinese PCT Application No. PCT/CN2017/072801 by Zhu et al., entitled "NETWORK ASSISTED MULTI-SUBSCRIPTION PHYSICAL LAYER SHARING", filed Feb. 2, 2017, each of which is assigned to the assignee hereof.

INTRODUCTION

The following relates generally to wireless communication, and more specifically to network assisted multi-subscription physical layer sharing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Multi-subscriber identity module (SIM) wireless communication devices have become increasingly popular because of the versatility that they provide, particularly in countries where there are many service providers. For example, a multi-SIM multi-standby (MSMS) device enables at least two SIMs to be in idle mode waiting to begin communications, but only allows one SIM at a time to participate in an active communication due to sharing of a single radio frequency (RE) resource (e.g., transceiver). As a result, during an active communication on one SIM, the wireless device may periodically tune away to a network associated with another SIM to monitor signals or to acquire a connection.

SUMMARY

The described techniques relate to improved methods, systems, devices, or apparatuses that support network assisted multi-subscription physical layer sharing. Generally, the described techniques provide for a method for wireless communication at a UE with multi-subscription is described. The method may include transmitting a multi-subscription coordination capability to a network; establishing a link for a first subscription with the network based at least in part on the multi-subscription coordination capability; and establishing a second subscription with the network using the link based at least in part on the multi-subscription coordination capability, the first subscription is associated with the second subscription.

An apparatus for wireless communication at the apparatus with a single radio and multi-subscription is described. The apparatus may include means for transmitting a multi-subscription coordination capability to a network; means for establishing a link for a first subscription with the network based at least in part on the multi-subscription coordination capability; and means for establishing a second subscription with the network using the link based at least in part on the multi-subscription coordination capability, the first subscription is associated with the second subscription.

Another apparatus for wireless communication at the apparatus with a single radio and multi-subscription is described. The apparatus may include a processor, memory in electronic communication with the processor. The processor and memory configured to cause the processor to transmit a multi-subscription coordination capability to a network; establish a link for a first subscription with the network based at least in part on the multi-subscription coordination capability; and establish a second subscription with the network using the link based at least in part on the multi-subscription coordination capability, the first subscription is associated with the second subscription.

A non-transitory computer readable medium for wireless communication at a UE with a single radio and multi-subscription is described. The non-transitory computer-readable medium may include instructions operable to cause a processor to transmit a multi-subscription coordination capability to a network; establish a link for a first subscription with the network based at least in part on the multi-subscription coordination capability; and establish a second subscription with the network using the link based at least in part on the multi-subscription coordination capability indicating the first subscription is associated with the second subscription.

Some examples of the method, apparatus, and non-transitory computer-readable medium described above may further include processes, features, means, or instructions for transmitting a radio resource control (RRC) message comprising a physical layer sharing capability as part of the multi-subscription coordination capability to the network. Some examples of the method, apparatus, and non-transitory computer-readable medium described above may further include processes, features, means, or instructions for identifying a request for multi-subscription operation, wherein transmitting the multi-subscription coordination capability to the network is based at least in part on the identifying.

In some examples of the method, apparatus, and non-transitory computer-readable medium described above, the UE comprises a SIM having at least two SIMs, wherein each of the at least two SIMs are associated with at least one subscription of multi-subscription. In some examples of the method, apparatus, and non-transitory computer-readable medium described above, the multi-subscription is associated with a single operator, or an indication to the network that multi-subscriptions are associated with a same UE in a same cell, or both.

Some examples of the method, apparatus, and non-transitory computer-readable medium described above may further include processes, features, means, or instructions for associating the physical layer sharing capability indication with the multi-subscription, Some examples of the method, apparatus, and non-transitory computer-readable medium described above may further include processes, features, means, or instructions for determining that the first subscription of the at least two SIMs is in a RRC connected state; and determining that the second subscription of the at least two SIMs is in a RRC idle state.

Some examples of the method, apparatus, and non-transitory computer-readable medium described above may further include processes, features, means, or instructions for identifying a first serving cell of the first subscription based at least in part on the multi-subscription coordination capability; and identifying a second serving cell of the second subscription based at least in part on the multi-subscription coordination capability.

Some examples of the method, apparatus, and non-transitory computer-readable medium described above may further include processes, features, means, or instructions for determining that the first serving cell of the first subscription is different from the second serving cell of the second subscription; triggering cell reselection to the first serving cell for the second subscription based at least in part on the determining; and initiating an RRC connection between the second subscription and the first serving cell based at least in part on triggering the cell reselection.

Some examples of the method, apparatus, and non-transitory computer-readable medium described above May further include processes, features, means, or instructions for determining that a serving cell of the first subscription is different from a serving cell of the second subscription; triggering cell reselection to the serving cell of the first subscription for the second subscription based at least in part on the determining; and initiating an RRC connection for the second subscription based at least in part on triggering the cell reselection Some examples of the method, apparatus, and non-transitory computer-readable medium described above where initiating the RRC connection may further include processes, features, means, or instructions for transmitting subscription association information associated with the second subscription to the network. Some examples of the method, apparatus, and non-transitory computer-readable medium described above may further include processes, features, means, or instructions for establishing a communication link between the first subscription and the first serving cell.

Some examples of the method, apparatus, and non-transitory computer-readable medium described above where initiating the RRC connection between the second subscription and the first serving cell may further include processes, features, means, or instructions for determining that a camped cell of the second subscription is different than the first serving cell; initiating an RRC connection setup phase for the second subscription; transmitting subscription association information between the first subscription and the second subscription to the serving cell of the first subscription based at least in part on a radio network temporary identifier (RNTI) list comprising at least an RNTI of the first subscription; and receiving an RRC connection reconfiguration message from the serving cell with physical layer sharing and at least one multi-subscription parameter.

In some examples of the method, apparatus, and non-transitory computer-readable medium described above, the transmitting the association is via at least one of a new information element (IE) in an existing RRC message, or a connection setup complete message, or a new RRC message. Some examples of the method, apparatus, and non-transitory computer-readable medium described above may further include processes, features, means, or instructions for determining that the second subscription of the at least two SIMS is in the RRC connected state.

Some examples of the method, apparatus, and non-transitory computer-readable medium described above where determining that the first subscription and the second subscription of the at least two SIMs are in the RRC connected state may further include processes, features, means, or instructions for determining that first subscription and the second subscription are in the RRC connected state with a same serving cell; and transmitting a subscription association indication to the same serving cell based at least in part on the determining.

Some examples of the method, apparatus, and non-transitory computer-readable medium described above may further include processes, features, means, or instructions for transmitting, via the first subscription, identity information associated with the UE to the network using at least one of an IE of a data packet, a RRC connection message, a dedicated RRC message, or a combination thereof. Some examples of the method, apparatus, and non-transitory computer-readable medium described above may further include processes, features, means, or instructions for transmitting, via the second subscription, identity information associated with the UE to the network using at least one of an IE of a data packet, a RRC connection message, a dedicated RRC message, or a combination thereof.

Some examples of the method, apparatus, and non-transitory computer-readable medium described above may further include processes, features, means, or instructions for performing radio link failure (RLF) measurement using the at least one subscription; detecting RLF based at least in part on the performed RLF measurement; and performing RLF recovery on both of the subscriptions associated with the at least two SIMs based at least in part on the detected RLF.

In some examples of the method, apparatus, and non-transitory computer-readable medium described above, the at least one subscription is configured to perform radio resource management (RRM) measurement. In some examples of the method, apparatus, and non-transitory computer-readable medium described above, the at least one subscription is configured to perform channel state information (CSI) measurement. In some examples of the method, apparatus, and non-transitory computer-readable medium described above, the at least one subscription is configured to perform power headroom (PHR) measurement. Some examples of the method, apparatus, and non-transitory computer-readable medium described above may further include processes, features, means, or instructions for performing a RRM measurement, or a CSI measurement, or a PHR measurement, or a RLF measurement, or a combination thereof using at least one subscription based at least in part on the subscription association information. In some examples of the method, apparatus, and non-transitory computer-readable medium described above, both of the at least one subscription are configured to transmit measurement reports using a same or different transmission time interval (TTI). In some examples of the method, apparatus, and non-transitory computer-readable medium described above, the measurement reports comprises at least one of a RRM measurement, CSI measurement, PHR measurement, or a combination thereof.

In some examples of the method, apparatus, and non-transitory computer-readable medium described above, the at least one of schedule data, control channel, or a combination thereof is configured on a same or different TTI. Some examples of the method, apparatus, and non-transitory computer-readable medium described above may further include processes, features, means, or instructions for determining concurrent transmission of data or control information via both the subscriptions during a same TTI; and configuring a power level of the UE based at least in part on the determining. Some examples of the method, apparatus, and non-transitory computer-readable medium described above where configuring the power level may further include processes, features, means, or instructions for proportionally distributing transmission power level to the both the at least one subscription.

In some examples of the method, apparatus, and non-transitory computer-readable medium described above, the first subscription is associated with a first set of network slices and the second subscription is associated with a second set of network slices. In some examples of the method, apparatus, and non-transitory computer-readable medium described above, the first set of network slices and the second set of network slices are different. In some examples of the method, apparatus, and non-transitory computer-readable medium described above, the first set of network slices is associated with a first signaling connection and the second set of network slices is associated with a second signaling connection.

In some examples of the method, apparatus, and non-transitory computer-readable medium described above, the first signaling connection is independent of the second signaling connection. In some examples of the method, apparatus, and non-transitory computer-readable medium described above, the first set of network slices is associated with a first control network function (CNF) and a first access and mobility function (AMF), in some examples of the method, apparatus, and non-transitory computer-readable medium described above, the second set of network slices is associated with a second CNF and a second AMF.

In some examples of the method, apparatus, and non-transitory computer-readable medium described above, the first set of network slices and the second set of network slices share a common UE, RF, and physical link based at least in part on multi-subscription coordination of the network and the UE. In some examples of the method, apparatus, and non-transitory computer-readable medium described above, the first set of network slices and the second set of network slices share a common control network function (CCNF). In some examples of the method, apparatus, and non-transitory computer-readable medium described above, the shared CCNF comprises at least one of a AMF, a signaling connection, or a combination thereof.

In some examples of the method, apparatus, and non-transitory computer-readable medium described above, the physical layer sharing capability indication is associated with at least the first subscription and the second subscription being associated with a same serving cell, in some examples of the method, apparatus, and non-transitory computer-readable medium described above, the multi-subscription coordination capability comprises at least one of a SIM, a universal SIM (USIM), a CDMA SIM (CSIM), a user identity module (UIM), a soft SIM, a credential, or a combination thereof.

In some examples of the method, apparatus, and non-transitory computer-readable medium described above, the SIM comprises at least one of a unique subscriber identifier (ID), a security key, one or more additional parameters, or a combination thereof. In some examples of the method, apparatus, and non-transitory computer-readable medium described above, the UE may be associated with at least one of a single radio or multiple radios.

Some examples of the method, apparatus, and non-transitory computer-readable medium described above may further include processes, features, means, or instructions for reporting subscription association information of multiple subscriptions associated with the multiple radios of the UE to the network, each radio of the multiple radios is associated with at least one subscription.

A method of wireless communication is described. The method may include receiving a physical layer sharing capability indication from a UE; and receiving a multi-subscription coordination capability from the UP.

An apparatus for wireless communication is described. The apparatus may include means for receiving a physical layer sharing capability indication from a UE; and means for receiving a multi-subscription coordination capability from the UE.

Another apparatus for wireless communication is described, apparatus may include a processor, memory in electronic communication with the processor. The processor and memory configured to cause the processor to receive a physical layer sharing capability indication from a UE; and receive a multi-subscription coordination capability from the UE.

A non-transitory computer readable medium for wireless communication is described. The non-transitory computer-readable medium may include instructions operable to cause a processor to receive a physical layer sharing capability indication from a UE; and receive a multi-subscription coordination capability from the UE.

In some examples of the method, apparatus, and non-transitory computer-readable medium described above, the physical layer sharing capability indication is associated with at least two subscriber identify modules (SIMs) wherein each of the at least two SIMs are associated with at least one subscription of multi-subscription.

Some examples of the method, apparatus, and non-transitory computer-readable medium described above may further include processes, features, means, or instructions for configuring PHR measurements and reporting for both the at least one subscription. Some examples of the method, apparatus, and non-transitory computer-readable medium described above may further include processes, features, means, or instructions for configuring CSI measurements and reporting for both the at least one subscription. Some examples of the method, apparatus, and non-transitory computer-readable medium described above may further include processes, features, means, or instructions for configuring peak to average power ratio measurements and reporting for both the at least one subscription.

Some examples of the method, apparatus, and non-transitory computer-readable medium described above may further include processes, features, means, or instructions for receiving from a first subscription identity information associated with the UE; receiving from a second subscription identity information associated with the UE; comparing the identity information received from the first subscription and the second subscription; and validating the identity information based at least in part on the comparison.

Some examples of the method, apparatus, and non-transitory computer-readable medium described above may further include processes, features, means, or instructions for comparing the received identity information from the first subscription and the second subscription with an identity of the UE registered in a home subscriber server database.

Some examples of the method, apparatus, and non-transitory computer-readable medium described above may further include processes, features, means, or instructions for determining that a first subscription of the at least two SIMs is connected with a first serving cell; determining that a second subscription of the at least two SIMs is connected with a second serving cell; determining that the first serving cell and the second serving cell are different; and triggering cell reselection to the first serving cell for the second subscription based at least in part on determining the difference.

In some examples of the method, apparatus, and non-transitory computer-readable medium described above, the cell reselection to the first serving cell for the second subscription is based at least in part on a carrier aggregation configuration. In some examples of the method, apparatus, and non-transitory computer-readable medium described above, the cell reselection to the first serving cell for the second subscription is based at least in part on a dual connectivity configuration. In some examples of the method, apparatus, and non-transitory computer-readable medium described above, the cell reselection to the first serving cell for the second subscription is based at least in part on a master cell group or a secondary cell group configuration.

BRIEF DESCRIPTION OF THE DRAWINGS

FIGS. 3A and 3B illustrate an example of a wireless communication system that supports network assisted multi-subscription physical layer sharing, in accordance with one or more aspects of the present disclosure.

DETAILED DESCRIPTION

Figure 1:
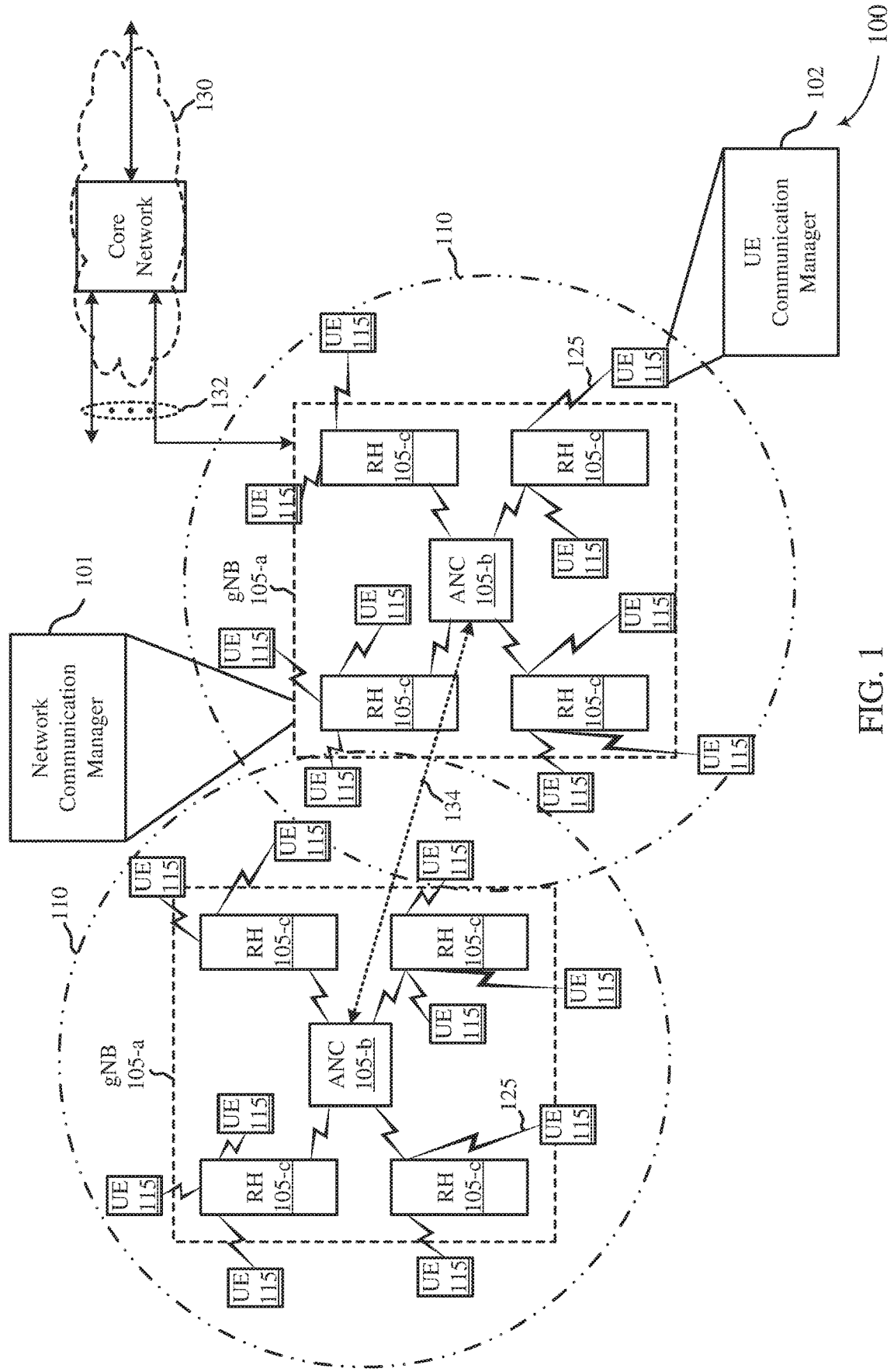
FIG. 1 illustrates an example of a wireless communication system for wireless communication that supports network assisted multi-subscription physical layer sharing, in accordance with one or more aspects of the present disclosure.

Techniques are described that support network assisted multi-subscription physical layer sharing. UEs, in some examples of wireless communication systems, may include one or more SIMS which enables a UE to connect to different mobile networks. Further application and use of multi-SIM UEs has become increasingly popular in condense populated geographic areas (e.g., China and other countries). Some UEs that support multi-SIM, however, are single radio, i.e., 1Tx/1Rx dual SIM dual standby (DSDS). As a result, out of multiple SIMs associated with a UE, only one SIM can be in an active state at a given time. This introduces problems when multiple operations are attempting to execute concurrently on the UE. For example, when one SIM is in voice call, another SIM would be in an out of service state. Thus, an incoming call to the out of service state SIM would be missed. In some cases, DSDS UEs may lack support for transmission and reception of concurrent circuit-switched and/or packet-switched data. For example, when one SIM is in a packet-switched connected mode, a mobile originated and/or mobile terminated call on another SIM would interrupt the packet-switched connection.

In some examples, two SIMS associated with the DSDS UE connect to a same serving cell. The same serving cell may be associated with a single network operator. To support dual SIM dual active (DSDA) by physical layer and RF resource sharing, the UE may monitor a physical downlink control channel for both SIMs of the UE. In some cases, physical layer processing may be shared between both SIMS. Alternatively, physical layer processing may also be invoked for both SIMs. However, without network awareness of physical layer sharing, DSDA. UE operation is supported on a best effort basis. For example, the network may handover two SIMs to different cells due to load balancing. In one example, the techniques described herein, provide a dual-SIM UE (i.e., DSDS UE) that may support DSDA by physical layer and RF resource sharing with assistance from a network (i.e., network awareness). In some examples, a dual-SIM UE may transmit an indication of a physical layer sharing capability to a network (e.g., eNodeB). The dual-SIM UE may transmit multi-subscription coordination capability to the network.

In some examples, the techniques described herein may support concurrent multiple network slices by multiple SIMs. Network slicing may enable one or more services to run over a dedicated network slice (e.g., radio access network (RAN) portion and/or a core network (CN) portion). For example, the dedicated network slices may include a machine-type-communication (MTC) on an MTC network slice, a mobile broadband (MBB) on an MBB network slice, etc. In some cases, a UE may need to run two sets of network slices in parallel. For example, if a UE needs to run two network slices (e.g., MTC and MBB) in parallel, the UE may allocate resources between the two network slices, e.g., share same CCNF. A set of network slices may also include one or more network slices. The CCNF, in some examples, may include at least an AMF and signaling connection. However, in some cases, this sharing may increase complexity for resource allocation and may expense some benefits of network slicing on service specific modifications. In some examples, supporting multiple network slices by multiple SIMs of a UE may avoid this sharing issue. For example, in scenarios where the two slices are running on two SIMs with independent signaling connections and independent CCNF/AMF. As a result, this independent signaling and connections may enable different network slices to apply different modifications to services and operations of a corresponding SIM. The present disclosure also describes various technique with reference to next generation networks (e.g., 5G or NR networks) that are being designed to support features such as network assisted multi-subscription physical layer sharing.

Aspects of the disclosure are initially described in the context of a wireless communications system. Exemplary UEs, base stations (e.g., eNodeB (eNB), gNodeB (gNB)), systems, and process flow that supports network assisted multi-subscription physical layer sharing are then described, of the disclosure are further illustrated by and described with reference to apparatus diagrams, system diagrams, and flowcharts that relate to network assisted multi-subscription physical layer sharing.

FIG. 1 illustrates an example of a wireless communication system 100 for wireless communication that supports network assisted multi-subscription physical layer sharing, in accordance with one or more aspects of the present disclosure. The wireless communication system 100 may include network access devices 105 (e.g., gNB, and/or radio heads (RHs)), UEs 115, and a CN 130. In some examples, the wireless communication system 100 may be an LTE (or LTE-Advanced) network, or a NR network. In some cases, wireless communication system 100 may support enhanced broadband communications, ultra-reliable (i.e., mission critical) communications, low latency communications, and communications with low-cost and low-complexity devices.

Wireless communication system 100 may provide a dual-SIM UE (i.e., DSDS UE) that may be supported by physical layer and RF resource sharing with assistance from a network (i.e., gNB 105-a or CN 130). In some examples, a dual-SIM UE may transmit an indication of a physical layer sharing capability to the network. The dual-SIM UE may transmit a multi-subscription coordination capability to the network. In some cases, the dual-UE may have a set of network slices associated with each of the SIMs. Additionally or alternatively, some UEs may support multi-SIM, however, may be single radio, i.e., 1Tx/1Rx DSDS. Alternatively, some UEs may also support multi-SIM and may have multiple radios. For example, UE 115 may support three SIMs and have dual radios, i.e., 2Tx/2Rx. In some cases, a subset (e.g., two out of the three supported SIMs) of the multiple SIMs may be associated with physical layer sharing. However, in some examples, the network may still need to be aware of all of the SIMs supported by the UE. Physical layer sharing may be associated with multiple SIMs sharing a same radio (e.g., Tx/Rx), different radio associated with a UE.

UE 115 may also, in some examples, transmit multi-subscriber association information to the network. The multi-subscriber association information may inform a network of multiple subscribers belonging to a same UE (e.g., UE 115). In some examples, the multi-subscriber association information may be reported by the UE 115, for example, in a IE, or an RRC message, etc. In some cases, a network may need to be aware of one or more SIMs sharing a physical layer to support network assisted physical layer sharing by the network. Alternatively, in some cases, multi-subscriber association may not need to have physical layer sharing. For example, the multi-subscriber association reporting of the UE 115 signaling may be independent of physical layer sharing. Network assisted physical layer sharing, in wireless communication system 100, is for a network to maintain multiple SIMs in a same cell (e.g., serving cell, gNBs 105-a). Without network awareness of multi-SIM UEs and physical lay sharing, networks may handover two or more SIMs of a UE to different cells.

The CN 130 may provide user authentication, access authorization, tracking, Internet Protocol (IP) connectivity, and other access, routing, or mobility functions. At least some of the network access devices 105 (e.g., eNBs, gNBs, or access node controllers (ANCs) 105-b) may interface with the CN 130 through backhaul links 132 (e.g., S1, S2, etc.) and may perform radio configuration and scheduling for communication with the UEs 115. In various examples, the ANCs 105-b may communicate, either directly or indirectly (e.g., through CN 130), with each other over backhaul links 134 (e.g., X1, X2, etc.), which may be wired or wireless communication links. Each ANC 105-b may additionally or alternatively communicate with a number of UEs 115 through a number of smart radio heads (radio heads) 105-c. In an alternative configuration of the wireless communication system 100, the functionality of an ANC 105-b may be provided by a radio head 105-c or distributed across the radio heads 105-c of an gNB 105-a. In another alternative configuration of the wireless communication system 100, the radio heads 105-c may be replaced with base stations, and the ANCs 105-may be replaced by base station controllers (or links to the CN 130).

The ANCs 105-b may wirelessly communicate with the UEs 115 via one or more radio heads 105-c, with each radio head 105-c having one or more antenna. Each of the radio heads 105-c may provide communication coverage for a respective geographic coverage area 110. The geographic coverage area 110 for a radio head 105-c may be divided into sectors making up only a portion of the coverage area (not shown). In some examples, the network access devices 105 may be replaced with alternative network access devices, such as base transceiver stations, radio base stations, access points, radio transceivers, gNBs, eNBs, Home NodeBs, Home gNBs, etc. The wireless communication system 100 may include radio heads 105-c (or base stations or other network access devices) of different types (e.g., macro cell and/or small cell network access devices). The one or more geographic coverage area 110 of the radio heads 105-c or other network access devices may overlap. In some examples, different gNBs 105-a may be associated with different radio access technologies.

In some examples, the wireless communication system 100 may include a 5G network. In other examples, the wireless communication system 100 may include a LTE/LTE-A network. The wireless communication system 100 may in some cases be a heterogeneous network, in which different types of eNBs or gNBs provide coverage for various geographical regions. For example, each eNB, gNB, or RH may provide communication coverage for a macro cell, a small cell, and/or other types of cell. The term "cell" is a 3GPP term that can be used to describe a base station, a radio head, a carrier or component carrier associated with a base station or a radio head, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell may additionally or alternatively cover a relatively small geographic area (e.g., a home) and may provide restricted access by UEs 115 having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. A gNB may support one or multiple (e.g., two, three, four, and the like) cells (e.g., component carriers).

The wireless communication system 100 may support synchronous or asynchronous operation. For synchronous operation, the gNBs 105-a and/or radio heads 105-c may have similar frame timing, and transmissions from different gNBs 105-a and/or radio heads 105-c may be approximately aligned in time. For asynchronous operation, the gNBs 105-a and/or radio heads 105-c may have different frame timings, and transmissions from different gNBs 105-a and/or radio heads 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may additionally or alternatively use Hybrid ARQ (HARQ) to provide retransmission at the MAC layer to improve link efficiency. In the control plane, the RRC protocol layer may provide establishment, configuration, and maintenance of an RRC connection between a UE 115 and a radio head 105-c, ANC 105-h, or CN 130 supporting radio bearers for user plane data. At the Physical (PRY) layer, transport channels may be mapped to physical channels.

The UEs 115 may be dispersed throughout the wireless communication system 100, and each UE 115 may be stationary or mobile. A UE 115 may additionally or alternatively include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE may be able to communicate with various types of gNBs 105-a, radio heads 105-c, base stations, access points, or other network access devices, including macro gNBs, small cell gNBs, relay base stations, and the like. A UE may additionally or alternatively be able to communicate directly with other UEs (e.g., using a peer-to-peer (P2P) protocol).

The communication links 125 shown in wireless communication system 100 may include uplink (UL) channels from a UE 115 to a radio head 105-c, and/or downlink (DL) channels, from a radio head 105-c to a UE 115. The downlink channels may additionally or alternatively be called forward link channels, while the uplink channels may additionally or alternatively be called reverse link channels. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques (e.g., as described with reference to FIGS. 3-8). In some examples, the control information transmitted during a TTI or slot of a downlink channel may be distributed between different control regions in a cascaded manner (e.g., between a common control region and one or more UE-specific control regions).

One or more of gNBs 105-a may include a network communication manager 101, which may provide network assisted multi-subscription physical layer sharing. In some examples, the network communication manager 101 may receive a physical layer sharing capability indication from UE 115. The network communication manager may, additionally or alternatively, receive multi-subscription coordination capability from UE 115. The physical layer sharing capability indication is associated with at least two SIMs. Network communication manager 101 may be an example of base station communications manager 1315 described with reference to FIG. 13.

UEs 115 may include a UE communication manager 102, which may transmit, via a one or more radios of UE 115, a physical layer sharing capability indication to one or more gNBs 105-a. UE communication manager 102 may, additionally or alternatively, transmit multi-subscription coordination capability to one or more gNBs 105-a. In some examples, multi-subscription may be capable of being concurrently in an active state based on transmitted physical layer sharing capability indication and multi-subscription coordination capability. UE communication manager 102 may be an example of UE communication manager 915 described with reference to FIG. 9. The techniques described herein is based on dual SIM, however, the present disclosure is also applicable to more than two SIMs, with same mechanism. SIM herein may include at least one of a SIM, a USIM, a CSIM, a HIM, a soft SIM, a credential, or a combination thereof. As used herein, SIM may also be interchangeably referred to as a memory that may be an integrated circuit or embedded into a removable card, and that stores IMSI, related key, and/or other information used to identify and/or authenticate a UE 115 on a network and enables a communication service with the network.

In some examples, responsive to powering on, UE 115 may search for wireless networks from which the UE 115 may receive and identify communication service. UE 115 may also perform registration process on an identified network (e.g., serving network gNB 105-a), and UE 115 may operate in a connected mode to actively communicate with the identified network. Alternatively, UE 115 may operate in an idle mode and camp on a serving network if an active communication session is not available for UE 115. In the idle mode, UE 115 may identify all radio access technologies (RATS) in which UE 115 is able to find an available serving cell.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

In some examples of the wireless communication system 100, the radio heads 105-c and/or UEs 115 may include multiple antennas for employing antenna diversity schemes to improve communication quality and reliability between radio heads 105-c and UEs 115. Additionally or alternatively, radio heads 105-c and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may additionally or alternatively be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from network access devices 105. In some cases, groups of UEs 115 communicating via D2D communications may utilize a one-to-many (1:M) system in which each UE 115 transmits to every other UE 115 in the group. In some cases, network access devices 105 facilitate the scheduling of resources for D2D communications. In other cases, D2D communications are carried out independent of network access devices 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Network access devices 105 may be connected by an S1 interface to the CN 130. The CN may be an evolved packet core (EPC), which may include at least one MME, at least one S-GW, and at least one P-GW. The mobile management entity (MME) may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The CN 130 may provide use authentication, access authorization, tracking, Internet Protocol (IP) connectivity, and other access, routing, or mobility functions. At least some of the network devices, such as gNB 105-a may include subcomponents such as an access network entity 105-b, which may be an example of an access node controller (ANC). Each access network entity 105-b may communicate with a number of UEs 115 through a number of other access network transmission entities 105-c, each of which may be an example of a smart radio head, or a transmission/reception point (TRP).

Wireless communication system 100 may support millimeter wave (mmW) communications between UEs 115 and network access devices 105, Devices operating in mmW or extremely high frequency (EHF) hands may have multiple antennas to allow beamforming. That is, network access devices 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., network access devices 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communication system 100 tray use beamforming. For example, network access devices 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of network access devices 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with network access devices 105 may be located in diverse geographic locations. Network access devices 105 may multiple use antennas or antenna arrays to conduct beamforming operations for directional communications with a UE 115.

In some cases, wireless communication system 100 may utilize both licensed and unlicensed RF spectrum bands. For example, wireless communication system 100 may employ LTE License Assisted Access (LTE-LAA) or LTE Unlicensed (LTE U) radio access technology or NR technology in an unlicensed band such as the 5 Ghz industrial, Scientific, and Medical (ISM) band. When operating in unlicensed RF spectrum bands, wireless devices such as network access devices 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both.

Figure 2:
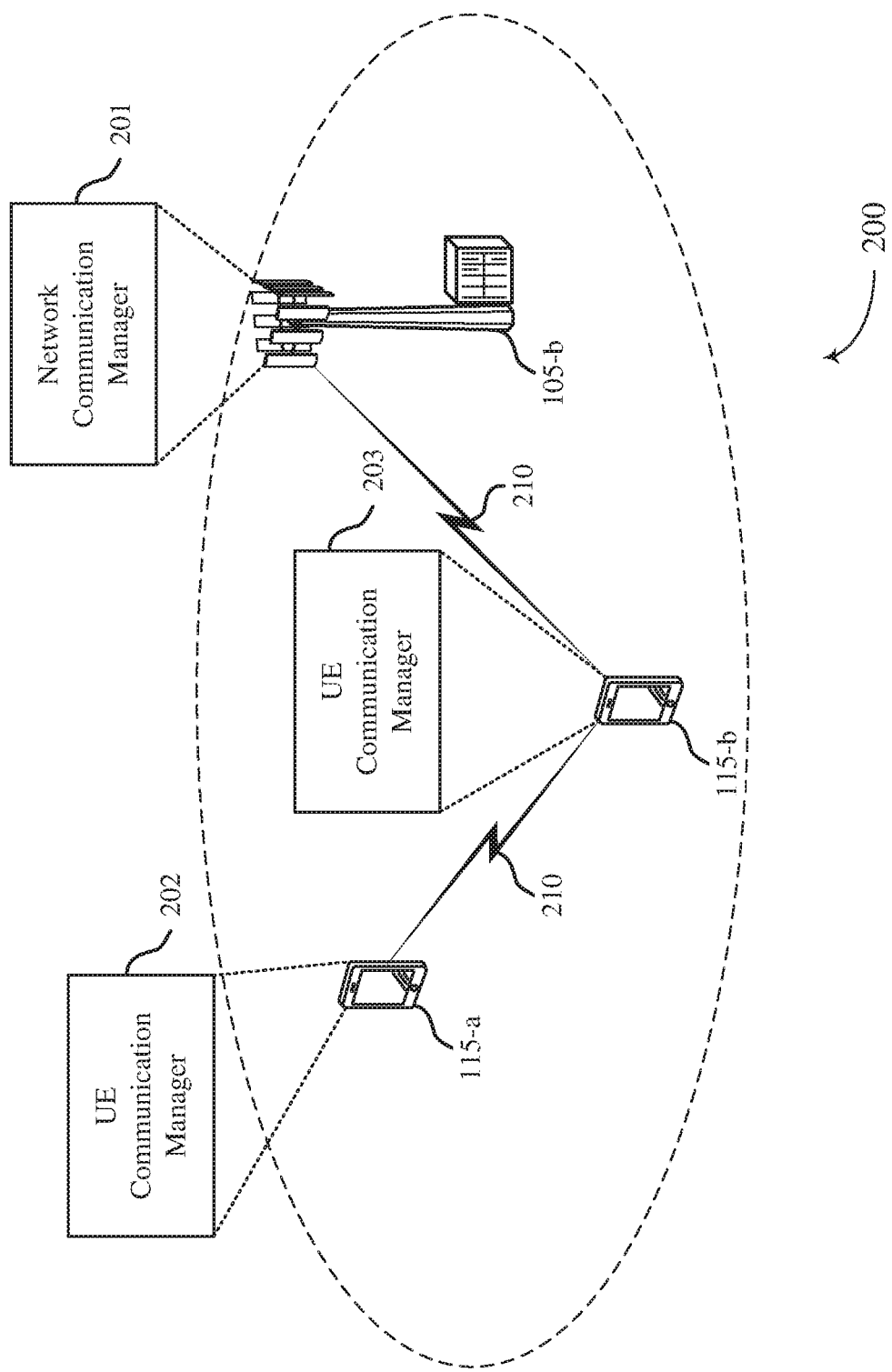
FIG. 2 illustrates an example of a wireless communication system that supports network assisted multi-subscription physical layer sharing, in accordance with one or more aspects of the present disclosure.

FIG. 2 illustrates an example of a wireless communication system 200 that supports network assisted multi-subscription physical layer sharing, in accordance with one or more aspects of the present disclosure. Wireless communication system 200 may include base station (e.g., gNB) 105-b and UE 115-a and UE 115-b, which may be examples of the corresponding devices described with reference to FIG. 1. Base station 105-b, UE 115-a, and UE 115-b may communicate over communication link 210. In some examples, base station 105-b and UE 115-a may communicate directly. Alternatively, base station 105-b and UE 115-a may communicate via relay device (e.g., UE 115-b).

Base station 105-b, UE 115-a, and UE 115-b may include network communication manager 201, UE communication manager 202, and UE communication manager 203, respectively. In some examples, UE communication manager 202 may transmit a physical layer sharing capability indication directly to base station 105-b. UE communication manager 202 may, also or alternatively, transmit multi-subscription coordination capability directly to base station 105-b. Alternatively, UE communication manager 202 may transmit a physical layer sharing capability indication and multi-subscription coordination capability indirectly to base station 105-b via UE 115-b using communication link 210. UE communication manager 203 may perform similar operations to UE communication manager 202, For example, UE communication manager 203 may transmit a physical layer sharing capability indication and multi-subscription coordination capability directly to base station 105-b, via communication link 210. Network communication manager 201 may receive physical layer sharing capability indication from UE 115-a and/or UE 115-b. In some examples, network communication manager 201 may receive multi-subscription coordination capability from UE 115-a and/or UE 115-b.

In some cases, the physical layer sharing capability may be transmitted by UE communication manager 202 or UE communication manager 203 in a RRC message. UE communication manager 202 or UE communication manager 203 may identify a request for multi-subscription operation. In some examples, UE communication manager 202 or UE communication manager 203 may transmit the multi-subscription coordination capability to base station 105-b based on the request. UE communication manager 202 and/or UE communication manager 203 may be associated with a multi-SIM. The multi-SIM may include at least two SIMs that are associated with a shared and/or unshared RF resources. The multi-SIM may, additionally or alternatively, include at least two SIMs that are each associated with at least one subscription. The at least one subscription may be associated with multiple subscriptions. In some examples, the multi-SIM may be associated with a single operator (e.g., base station 105-b). When multiple SIMs on UE 115-a and/or UE 115-b belong to a same operator, physical sharing may force multiple SIMs to camp/connect to the same cell. The resource frequency and physical layer may be shared by the multiple SIMs, while the MAC and higher layer are separated. For the physical layer transmitter processing, the symbols from the multiple SIMs may be to a same inverse fast Fourier transform (WET) for further processing and transmission. For the physical receiver processing, the symbols from the same fast Fourier transform (EFT) may be separated to multiple SIMs.

In some examples, SIM comparison and correlation options may be applicable to UE level correlation. For example, UE 115-a and UE 115-h may each include one SIM that is associated with a subscription, UE 115-a and UE 115-b may each or at least one of the UEs 115 may report the SIM/subscription correlation without reporting physical layer sharing capability. In some examples, UE 115-a and UE 115-b may communicate D2D, where at least one of the UE acts as a relay device. In this case, base station 105-h may manage communication between UE 115-a and UE 115-b effectively based on an indication that UE 115-a and/or UE 115-b are communicating D2D which may indicate to base station 105-h that the UE 115-a and UE 115-b belong the same cell.

When multi-SIM operation is needed, UE 115-a and/or UE 115-b may indicate SIM groups or SIM association information (i.e., subscription association information) to base station 105-b. In some examples, UE communication manager 202 and/or UE communication manager 203 may determine that a first subscription of a first SIM of the at least two SIMs is in an RRC connected state. The UE communication manager 202 and/or UE communication manager 203 may determine that a second subscription of a second SIM of the at least two SIMs is in a RRC idle state. UE communication manager 202 and/or UE communication manager 203 may then identify a first serving cell of the first subscription of the first SIM based on the multi-subscription coordination capability. For example, UE communication manager 202 and/or UE communication manager 203 may identify that base station 105-b is a serving cell of a first subscription of a first SIM of UE 115-a and/or UE 115-b. Additionally, UE communication manager 202 and/or UE communication manager 203 may identify a second serving cell of the second subscription of the second SIM based on the multi-subscription coordination capability. For example, UE communication manager 202 and/or UE communication manager 203 may identify that a different base station (not shown) is a serving cell of the second SIM of UE 115-a and/or UE 115-b.

UE communication manager 202 and/or UE communication manager 203 may determine that the first serving cell of the first subscription of the first SIM is different from the second serving cell of the second subscription of the second SIM, and trigger cell reselection to the first serving cell for the second subscription of the second SIM. As a result, UE 115-a or UE 115-b may reselect the RRC idle state SIM to the same cell as the RRC connected state SIM, if the two SIMs are in a different cell. In some examples, cell reselection may include, UE communication manager 202 and/or UE communication manager 203 of UE 115-a and/or UE 115-h, initiating an RRC connection between the second SIM and the serving cell of the first SIM (e.g., base station 105-a). UE 115-a and/or UE 115-b may initiate the RRC connection and indicate SIM association to the base station 105-a. In some cases, the first SIM and the second SIM of UE 115-a and/or UE 115-b may both be in RRC connected state in a same cell (e.g., base station 105-b). As a result, UE 115-a and/or UE 115-b may indicate SIM association to the base station 105-b.

In some examples, UE 115-a and/or UE 115-b may indicate SIM association information to a serving cell in terms of a RNTI list. In some examples, a first subscription of a first SIM may be connected to base station 105-a and may be assigned an RNTI unique to base station 105-b, e.g., C-RNTI. For example, UE communication manager 202 and/or UE communication manager 203 may establish a communication link between a first SIM of UE 115-a and/or UE 115-b with base station 105-b. After the communication link is established or during the establishing phase, the first SIM of UE 115-a and/or UE 115-b may be assigned a RNTI that is associated with base station 105-b. In some examples, network communication manager 201 may assign and transmit an RNTI to LIE 115-a and/or UE 115-b for the first SIM.

UE communication manager 202 and/or UE communication manager 203 may identify a camped cell of the second subscription of the second SIM of UE 115-a and/or UE 115-b. UE communication manager 202 and/or UE communication manager 203 may, in some examples, determine that base station 105-b is not the camped cell for the second SIM. If the camped cell of the second SIM is not base station 105-h, the second SIM may reselect to base station 105-b. For example, UE communication manager 202 and/or UE communication manager 203 may initiate an RRC connection setup phase between the second SIM and the base station 105-b. In some cases, the second SIM of UE 115-a and/or LIE 115-b may enter the RRC connection setup phase based on one or more events, and be assigned an RNTI. In some examples, network communication manager 201 may assign and transmit an RNTI to LIE 115-a and/or LIE 115-b for the second SIM. In some cases, the RNTI assigned to the first SIM and the RNTI assigned to the second SIM may be same or different.

In some examples, UE communication manager 202 and/or UE communication manager 203 of LIE 115-a and/or UE 115-b may transmit a SIM association to network communication manager 201 of base station 105-b. For example, the second SIM may report the SIM association with the first SIM to base station 105-b by RRC signaling, e.g., RRC Connection Setup Complete (Co-located RNTI List). The list may include the RNTI of the first SIM only. The SIM association may be related to the first SIM and the second SIM. In some examples, the SIM association may be transmitted in a new RRC connection setup complete message.

In some examples, network communication manager 201 may validate and support avoidance of UE 115-a and/or UE 115-b reporting false device identity. If the device identity is invalid, base station 105-b will terminate associating it with a corresponding SIM. For example, base station 105-b may receive from a first SIM and a second SIM identity information associated with UE 115-a and/or UE 115-b. The network communication manager 201 of base station 105-b may compare the identity information received and validate the identity information based on the comparison. In some cases, network communication manager 201 may compare the received identity information from the first SIM and the second SIM with an identity of UE 115-a and/or UE 115-b registered in a home subscriber server database. The network communication manager 201 may alternatively validate device identity by forwarding the reporting from UE 115-a and/or UE 115-b to a CN (e.g., CN 130) for validation. In some cases, UE 115-a and/or UE 115-b may be registered with home subscriber server. The CN may then validate the base station 105-b reported device identity by comparing it with the identity from home subscriber server. In some examples, a CN could receive identity from non-access stratum (NAS). CN may then forward the identity to RAN, e.g. in Initial Context Setup message, UE context modification message, or Handover Request message.

In some cases, a CN may store UE identity and IMSI/credential association. The event of association change or one IMSI/credential has more than one device identity may be used to detect the fake device identity report international mobile subscriber identity (IMSI)/credential association. In some examples, the SIM association or IMSI/credential may include more than one UE identity which may be used to detect false UE identity reporting when comparing a reported UE identity. In some examples, UE communication manager 202 and/or UE communication manager 203 of UE 115-a and/or UE 115-b may receive an RRC connection reconfiguration message from base station 105-b based on the validation.

In some examples, each SIM of UE 115-a and/or UE 115-h may independently report its identity e.g., to international mobile equipment identity (IMEI) to RAN. The identity information may be transmitted, in some examples, using at least one of an IE of a data packet, a RRC connection message, a dedicated RRC message, or a combination thereof.

The network communication manager 201 of base station 105-b may configure one or more parameters for UE 115-a and/or UE 115-b based on the SIM association information (i.e., subscription association information). For example, network communication manager 201 may configure cell reselection based on a CA configuration, a dual connectivity configuration, a master cell group (MCG) or secondary cell group (SCG) configuration, or a combination thereof. For example, network communication manager 201 may with information of multi-SIM and physical layer sharing from UE 115-a and/or UE 115-b, maintain the first and second SIM of UE 115-a and/or UE 115-b in a same cell (i.e., corresponding to base station 105-b). In some cases, when DL CA is configured, a primary cell associated with both the first and second SIM may be the same. Alternatively, in some cases CA may be configured to at least one of the two SIMs. In this case, the other SIM's serving cell may still be the same primary cell. Additionally or alternatively, in some examples, when a master cell is configured (e.g., associated with base station 105-b), a MCG and a SCG may be common for the first and second SIM. In some cases, at least one of the two SIMs of UE 115-a and/or UE 115-b may be configured with the MCG. In this case, the other SIM's serving cell may still be same as the MCG.

The network communication manager 201 of base station 105-b may support filtering duplicated RRM measurements and reporting from UE 115-a and/or UE 115-b. For example, network communication manager 201 may configure UE 115-a and/or UE 115-b such that only at least one of the two SIMs performs RRM measurements and reporting for both SIMs. In some examples, network communication manager 201 may configure different measurements on different SIM. For example, a first SIM of UE 115-a may perform CSI measurement and reporting, while the second SIM of UE 115-a may perform RRM measurements and reporting. Additionally, the different measurements on the first and second SIM may be configured to be transmitted in a same or different TTI.

In some examples, UE 115-a and/or UE 115-b may receive a configuration from base station 105-b that at least one SIM of the two SINN is configured to perform RRM measurement. UE 115-a and/or UE 115-b may also receive a configuration from base station 105-b that at least one SIM of the two SIMs is configured to perform CSI measurement. In some cases, UE 115-a and/or UE 115-b may also receive a configuration from base station 105-b that at least one SIM of the two SIMs is configured to perform PHR measurement.

UE 115-a and/or UE 115-b may also receive a configuration from base station 105-b that schedule data, control channel, or a combination thereof is configured on a same or different TTI.

In some examples, physical layer sharing by multiple SIMs may lead to higher peak average power ratio compared with single SIM operation when UE 115-a and/or UE 115-b may need to transmit data and/or control for both SIMs in a same TTI. As a result, the link budget between UE 115-a and/or UE 115-b and base station 105-b may be impacted due to potential higher peak average power ratio with concurrent data and/or control transmission for both SIMs. Base station 105-b may support reducing the peak average power ratio by configuring the SIMs of UE 115-a and/or UE 115-b to transmit data and/or control information in different TTI and different resource blocks. When UE 115-a and/or LIE 115-h need to transmit data and/or control for multiple SIMs in a same TTI, UE 115-a and/or UE 115-b may prioritize the power for control channel for one SIM if data is scheduled for the other SIM. In some examples, prioritizing the power may include equal power weighting among all SIMs with control transmission, or equal power weighting among all SIMs with data transmission.

In some examples, of physical layer sharing by UE 115-a and/or UE 115-b, the UEs may perform radio link monitoring (RLM) on a single SIM of the multiple SIMs available to UE 115-a and/or UE 115-v. In some cases, when REF is detected, UE 115-a and/or UE 115-h may perform RLF recovery on both SIMs. With network awareness (e.g., via base station 105-b) of physical layer sharing and multi-SIM operation, UE 115-a and/or UE 115-b may perform RLF recovery on a single SIM only. In some examples, UE 115-a and/or UE 115-b.

FIGS. 3A and 3B illustrate an example of a wireless communication system 300 that supports network assisted multi-subscription physical layer sharing, in accordance with one or more aspects of the present disclosure. FIG. 3A illustrates an example of the wireless communication system 300 that supports network assisted multi-subscription physical layer sharing, in accordance with one or more aspects of the present disclosure. In some examples, wireless communication system 300 may support concurrent multiple network slices by multiple SIMs. Network slicing may enable one or more services to run over a dedicated network slice (e.g., RAN portion and/or a CN portion). In some cases, if UE 115-c needs to run two network slices, one network slice (or set of network slices) for a first subscription and one network slice (or set of network slices) for a second subscription (e.g., MTC and MBB) in parallel, the UE 115-e may allocate resources between the network slices, e.g., share same CCNF. The CCNF, in some examples, may include at least AMF and signaling connection. An example of wireless communication system 300, may include UE 115-c, RAN 325, CCNF/AMF 335, data core network (DCN) 345 and DCN 355. UE 115-c may be examples of the corresponding devices described with reference to FIGS. 1-2. UE 115-c may also include a first SIM 310 and a second SIM 315, The first SIM 310 and the second SIM 315 may communicate information to the RAN 325 via a common communication link 320. The RAN 325 may then communication the information to CCNF/AMF 335 via communication link 330. The CCNF/AMF 335 may forward the information to DCN 345 and DCN 355 via communication links 340 and 350. However, in some cases, sharing of the common communication link 320 may increase complexity for resource allocation and may expense some benefits of network slicing on service specific modifications.

FIG. 3B illustrates an example of the wireless communication system 300 that supports network assisted multi-subscription physical layer sharing, in accordance with one or more aspects of the present disclosure. In some examples, wireless communication system 300 may support concurrent multiple network slices by multiple SIMs. Network slicing may enable one or more services to run over a dedicated network slice (e.g., RAN portion and/or a CN portion). Alternatively, an example of wireless communication system 300, may include UE 115-d, RAN 325-a, DCN 345-a, DCN 355-a, CCNF/AMF 335-a, and CCNF/AMF 335-b. UE 115-d may be examples of the corresponding devices described with reference to FIGS. 1-2. UE 115-d may also include a first SIM 310-a and a second SIM 315-a.

The first SIM 310 and the second SIM 315 may communicate information to the RAN 325 via a common communication link 320. As described above, in some examples the wireless communication system 300 may include dedicated network slices that may include MTC on an MTC network slice, a MBB on an MBB network slice, etc. In some cases, if UE 115-d needs to run two network slices (e.g., MTC and MBB) in parallel, the UE 115-d may allocate resources between the two network slices, e.g., share same CCNF. The CCNF, in some examples, may include at least AMF and signaling connection. However, in some cases, this sharing may increase complexity for resource allocation and may expense some benefits of network slicing on service specific modifications. Alternatively, wireless communication system 300 may support multiple network slices by multiple SIMs (i.e., the first SIM 310-a and the second SIM 315-a) of UE 115-d which may avoid this sharing issue. For example, when the two slices are running on UE 115-d (e.g., associated with first SIM 310-a and the second SIM 315-a) with independent signaling connections (e.g., common communication link 320) and independent CCNF/AMF via communication links 340. In other words, the first SIM 310-a and the second SIM 315-a may transmit data to RAN 325-a using independent communication links 320. At the RAN 325-a, the data may be forwarded also on independent communication link 340 to DCN 345-a and independent communication link 350 to DCN 355-a. The DCN 345-a and DCN 355-a may include corresponding CCNF/AMF 335-a and CCNF/AMF 335-b. As a result, this independent signaling and connections may enable different network slices to apply different modifications to services and operations of a corresponding SIM.

Figure 4:
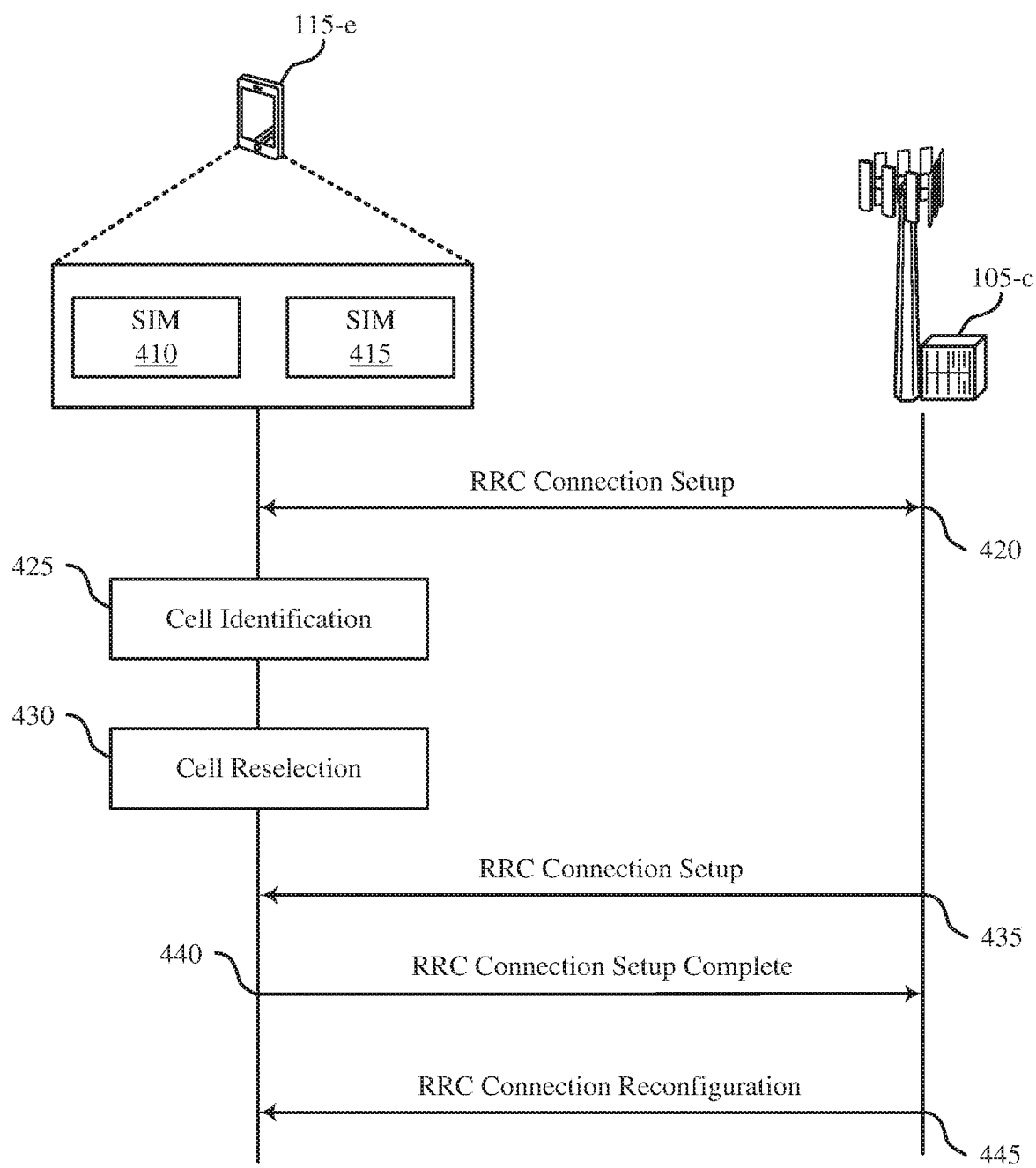
FIG. 4 illustrates an example of process flow that supports network assisted multi-subscription physical layer sharing, in accordance with one or more aspects of the present disclosure.

FIG. 4 illustrates an example of process flow 400 that supports network assisted multi-subscription physical layer sharing, in accordance with one or more aspects of the present disclosure. Process flow 400 may include base station 105-c and UE 115-e, which may be examples of the corresponding devices described with reference to FIGS. 1-3, UE 115-f may be a multi-subscriber UE. For instance, UE 115-e may include a first SIM 410 and a second SIM 415.

At 420, UE 115-e may establish a communication link with base station 105-c via RRC connection setup message. For example, the established communication link may be on the first SIM 410 of UE 115-e. In some examples, UE 115-e may receive and assign an RNTI to the first SIM 410. The RNTI may associate the first SIM 410 with the base station 105-c, In some examples, RRC connection setup may be used for UE 115-e (e.g., the first SIM 410 or the second SIM 415) to transition from RRC idle mode to RRC connected mode. UE 115-e may transition to RRC connected mode before transferring any application data, or completing any signaling procedures. For example, the first SIM 410 of UE 115-*e* may trigger RRC connection setup if an end-user starts an application to browse the internet, or to send an email. In some examples, prior to the RRC connection setup at 420, UE 115-*e* may transmit an RRC connection request message as part of a random access procedure. After transmitting the RRC connection request, in some examples, via the first SIM 410, UE 115-*e* may wait to receive the RRC connection setup message. The RRC connection setup message may include configuration for PUSCH, PUCCH, physical downlink shared channel (PDSCH) channels and information regarding uplink power control, channel quality indicator (CQI) reporting, the SRS, antenna configuration and scheduling requests for the first SIM 410 of UE 115-*e*.

At block 425, UE 115-*e* may identify a serving cell associated with the second SIM 415. In some examples, UE 115-*e* may determine that the identified serving cell of the second SIM is different from the base station 105-*c*, If the camped cell of the second SIM 415 is not same as for the first SIM 410, the second SIM 415 may, at block 430, trigger cell reselection. The cell reselection may include the second SIM 415 receiving, at block 435 an RRC connection setup message from the base station 105-*c*, in some examples, UE 115-*e* may receive and assign an RNTI to the second SIM 415. The RNTI may associate the second SIM 415 with the base station 105-*c*. In some examples, the second SIM 415 may be an idle mode. The RRC connection setup message may include configuration for PUSCH, PUCCH, PDSCH channels and information regarding uplink power control, CQI reporting, the SRS, antenna configuration and scheduling requests for the second SIM 415 of UE 115-*e*.

At 440, the second SIM 415 may transmit an RRC connection setup complete message to base station 105-*c*. In some cases, the RRC connection setup complete message is used to confirm successful completion of an RRC connection establishment. In some cases, the second SIM 415 may report an association with the first SIM 410 to base station 105-*c* by RRC signaling, e.g. RRC Connection Setup Complete (co-located RNTI List). In some cases, the CO-located RNTI list may only include the RNTI of the first SIM 410. The SIM association may also be included in an IE of the RRC connection setup complete message.

At 445, the second SIM 415 may receive an RRC connection reconfiguration message from base station 105-*c*. The RRC connection reconfiguration message may be command to modify an RRC connection for the second SIM 415, e.g., switch a connection to base station 105-*c* from a different camped cell.

Figure 5:
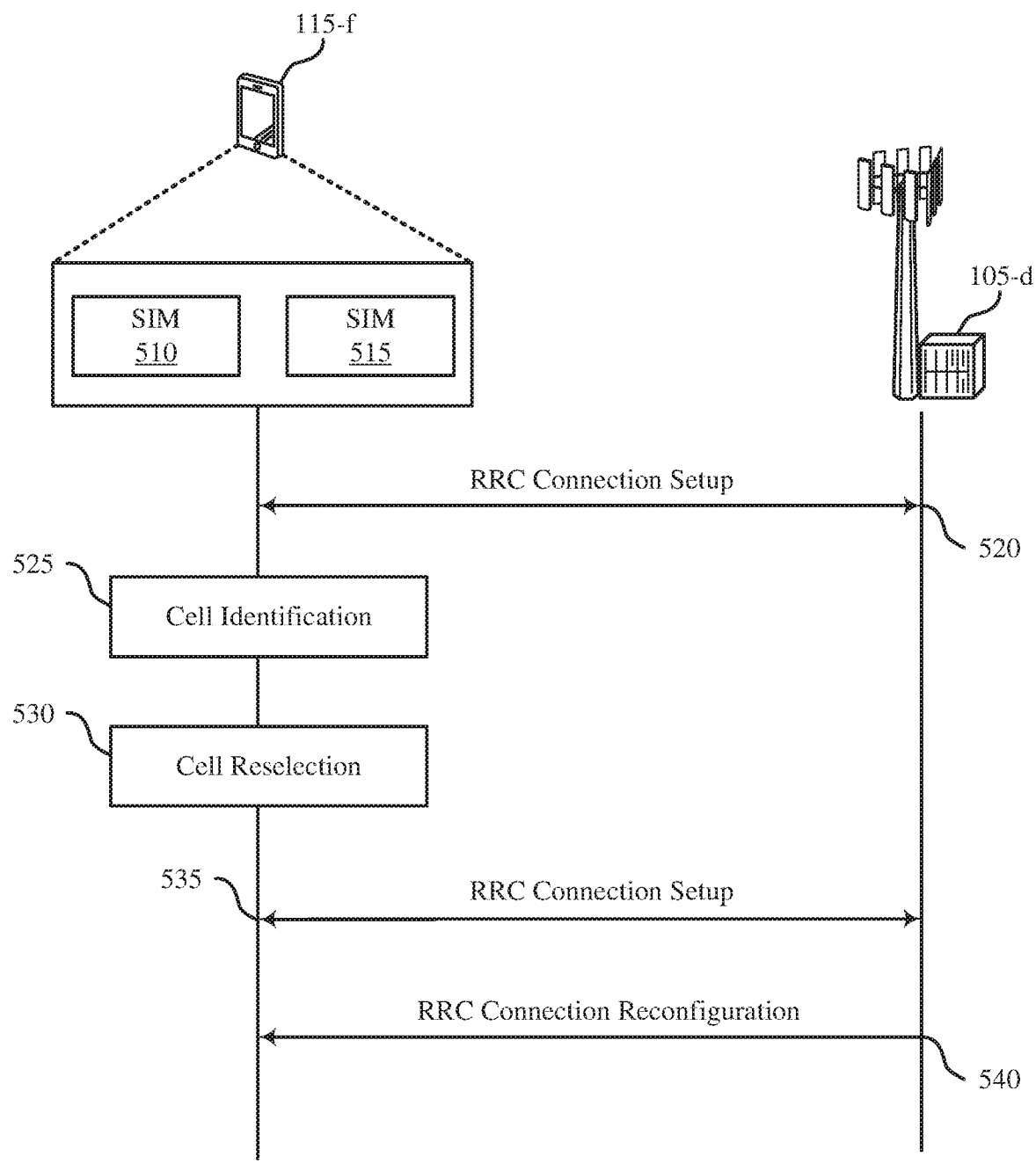
FIG. 5 illustrates an example of a process flow that supports network assisted multi-subscription physical layer sharing, in accordance with one or more aspects of the present disclosure.

FIG. 5 illustrates an example of a process flow 500 that supports network assisted multi-subscription physical layer sharing, in accordance with one or more aspects of the present disclosure. Process flow 500 may include base station 105-*d* and UE 115-*f*, which may be examples of the corresponding devices described with reference to FIG. 1-4. UE 115-*f* may be a multi-subscriber UE. For instance, UE 115-*f* may include a first SIM 510 and a second SIM 515.

At 520, UE 115-*f* may establish a communication link with base station 105-*d* via RRC connection setup message (IMEI). For example, the established communication link may be on the first SIM 510 of UE 115-*f* In some examples, RRC connection setup message may be used for UE 115-*f* (e.g., first SIM 510 or second SIM 515) to transition from RRC idle mode to RRC connected mode. UE 115-*f* may transition to RRC connected mode before transferring any application data, or completing any signaling procedures. For example, the first SIM 510 of UE 115-*f* may trigger RRC connection setup message if an end-user starts an application to browse the internet, or to send an email. In some examples, prior to the RRC connection setup message, UE 115-*f* may transmit an RRC connection request message as part of a random access procedure. After transmitting the RRC connection request message, in some examples, via the first SIM 510, UE 115-*f* may wait to receive the RRC connection setup message (IMEI), The RRC connection setup message may include configuration for PUSCH, PUCCH, PDSCH channels and information regarding uplink power control, CQI reporting, the SRS, antenna configuration and scheduling requests for the first SIM 510 of UE 115-*f*.

At block 525, UE 115-*f* may identify a serving cell associated with the second SIM 515. In some examples, UE 115-*f* may determine that the identified serving cell of the second SIM is different from the base station 105-*d*. If the camped cell of the second SIM 515 is not same as for the first SIM 510, the second SIM 515 may, at block 530, trigger cell reselection. The cell reselection may include the second SIM 515 initiating, at block 535 an RRC connection setup message (IMEI) between the second SIM 515 and the base station 105-*d*.

At 535, the second SIM 515 may receive an RRC connection setup message from base station 105-*d*. In some examples, the second STM 515 may be an idle mode. The RRC connection setup message may include configuration for PUSCH, PUCCH, PDSCH channels and information regarding uplink power control, CQI reporting, the SRS, antenna configuration and scheduling requests for the second SIM 515 of UE 115-*f*. At 540, the second SIM 515 may receive an RRC connection reconfiguration message from base station 105-*d*. The RRC connection reconfiguration message may be command to modify an RRC connection for the second SIM 515, e.g., switch a connection to base station 105-*d* from a different camped cell. In some examples, each SIM (i.e., first SIM 510 and second SIM 515) may independently report identity information of UE 115-*f*, IMEI to base station 105-*d*, or RAN, or CN, or a combination thereof. The identity information associated with UE 115-*f* maybe transmitted to base station 105-*d* using at least one of IE of a data packet, a RRC connection message, a dedicated RRC message, or a combination thereof.

Figure 6:
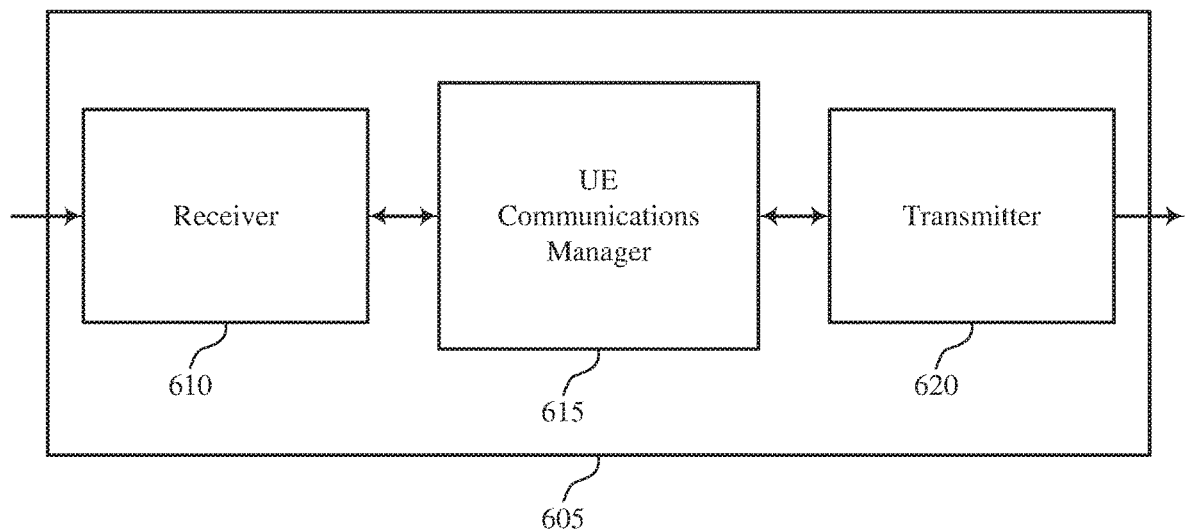
FIGS. 6 through 8 show block diagrams of a device that supports network assisted multi-subscription physical layer sharing, in accordance with one or more aspects of the present disclosure.

FIG. 6 shows a block diagram 600 of a wireless device 605 that supports network assisted multi-subscription physical layer sharing, in accordance with one or more aspects of the present disclosure. Wireless device 605 may be an example of aspects of a UE 115 as described with reference to FIG. 1, Wireless device 605 may include receiver 610, UE communication manager 615, and transmitter 620. Wireless device 605 may also include a processor, Each of these components may be in communication with one another (e.g., via one or more buses).

Receiver 610 may receive information such as packets, user data, or control information associated with various information channels (e.g., control channels, data channels, and information related to network assisted multi-subscription physical layer sharing, etc.). Information may be passed on to other components of the device. In some examples, receiver 610 may receive an RRC connection reconfiguration message from a serving cell. The receiver 610 may be an example of aspects of the transceiver 935 described with reference to FIG. 9.

UE communication manager 615 may be an example of aspects of the UE communication manager 102 described with reference to FIG. 1. UE communication manager 615 and/or at least some of its various sub-components may be implemented in hardware, software executed by a processor, firmware, or any combination thereof. If implemented in software executed by a processor, the functions of the UE communication manager 615 and/or at least some of its various sub-components may be executed by a general-purpose processor, a digital signal processor (DSP), art application-specific integrated circuit (ASIC), an field-programmable gate array (FPGA) or other programmable logic device, discrete gate or transistor logic, discrete hardware components, or any combination thereof designed to perform the functions described in the present disclosure.

The UE communication manager 615 and/or at least some of its various sub-components may be physically located at various positions, including being distributed such that portions of functions are implemented at different physical locations by one or more physical devices. In some examples, UE communication manager 615 and/or at least some of its various sub-components may be a separate and distinct component in accordance with various aspects of the present disclosure. In other examples, UE communication manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communication manager 615 may transmit a multi-subscription coordination capability to a network, establish a link for a first subscription with the network based on the multi-subscription coordination capability, and establish a second subscription with the network using the link based on the multi-subscription coordination capability, the first subscription is associated with the second subscription. The multi-subscription may be capable of being concurrently in an active state based on the transmitted physical layer sharing capability indication and the transmitted multi-subscription coordination capability.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas. Transmitter 620 may transmit a SIM association between a first SIM and a second SIM to a first serving cell, and may transmit the SIM association via a new RRC connection setup complete message. In some examples, transmitter 620 may transmit, via a first SIM of wireless device 605, identity information associated with the wireless device 605 to a network using at least one of an IE of a data packet, a RRC connection message, a dedicated RRC message, or a combination thereof. Alternatively, transmitter 620 may transmit, via a second SIM, identity information associated with the wireless device 605 to a network using at least one of an IE of a data packet, a RRC connection message, a dedicated RRC message, or a combination thereof. In some cases, the physical layer sharing capability is transmitted in a RRC message.

Figure 7:
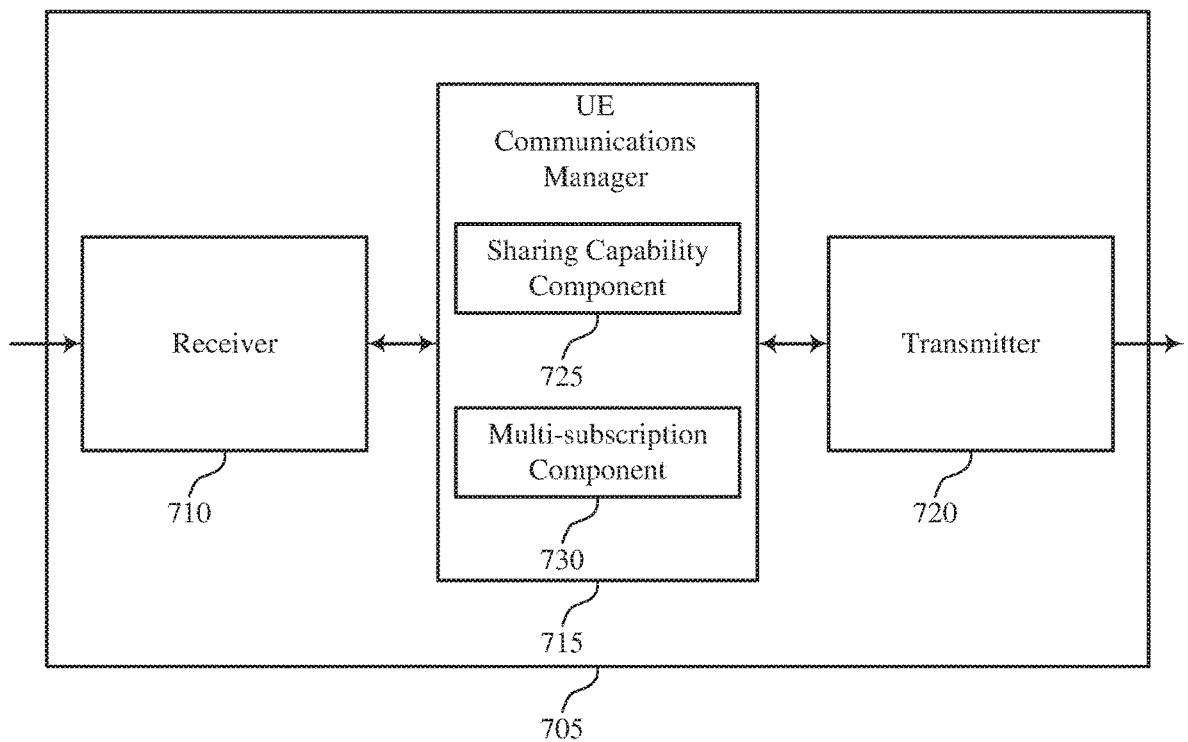

FIG. 7 shows a block diagram 700 of a wireless device 705 that supports network assisted multi-subscription physical layer sharing, in accordance with one or more aspects of the present disclosure. Wireless device 705 may be an example of aspects of a wireless device 605 or a UE 115 as described with reference to FIGS. 1 and 6. Wireless device 705 may include receiver 710, UE communication manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to network assisted multi-subscription physical layer sharing, etc.). Information may be passed on to other components of the device. The receiver 710 may be an example of aspects of the transceiver 935 described with reference to FIG. 9.

UE communication manager 715 may be an example of aspects of the UE communication manager 615 described with reference to FIG. 6. UE communication manager 715 may also include sharing capability component 725 and multi-subscription component 730. Sharing capability component 725 may transmit, via one or more radios on a UE (e.g., wireless device 705), a physical layer sharing capability indication to a network. In some cases, the physical layer sharing capability indication is based on performing radio link management measurements.

Multi-subscription component 730 may transmit multi-subscription coordination capability to a network. In some examples, the multi-subscription may be capable of being concurrently in an active state based on the transmitted physical layer sharing capability indication and the transmitted multi-subscription coordination capability. In some cases, a UE may include a multi-SIM having at least two SIMs associated with a shared RF resource. In some cases, multi-subscription component 730 may identify a first serving cell of a first SIM based on the multi-subscription coordination capability. Additionally or alternatively, multi-subscription component 730 may identify a second serving cell of a second SIM based on the multi-subscription coordination capability. In some cases, the at least two SIMs may include at least one of a unique subscriber ID, a security key, one or more additional parameters, or a combination thereof. In some examples, multi-subscription component 730 may identify a request for multi-subscription operation. In one case, transmitting the multi-subscription coordination capability to a network may be based on the identifying.

Multi-subscription component 730 may, in some examples, establish a communication link between a first SIM and a first serving cell. The multi-subscription component 730 may determine that a serving cell of a second SIM is different than the first serving cell. For example, multi-subscription component 730 may determine that a first serving cell of a first SIM is different from a second serving cell of a second SIM. In some cases, the multi-subscriber SIM is associated with a single operator. In some cases, at least one of schedule data, control channel, or a combination thereof is configured on a same or different TTI. In some cases, the multi-subscription coordination capability includes at least one of a SIM, a USIM, is CSIM, a UIM, a soft SIM, a credential, or a combination thereof.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
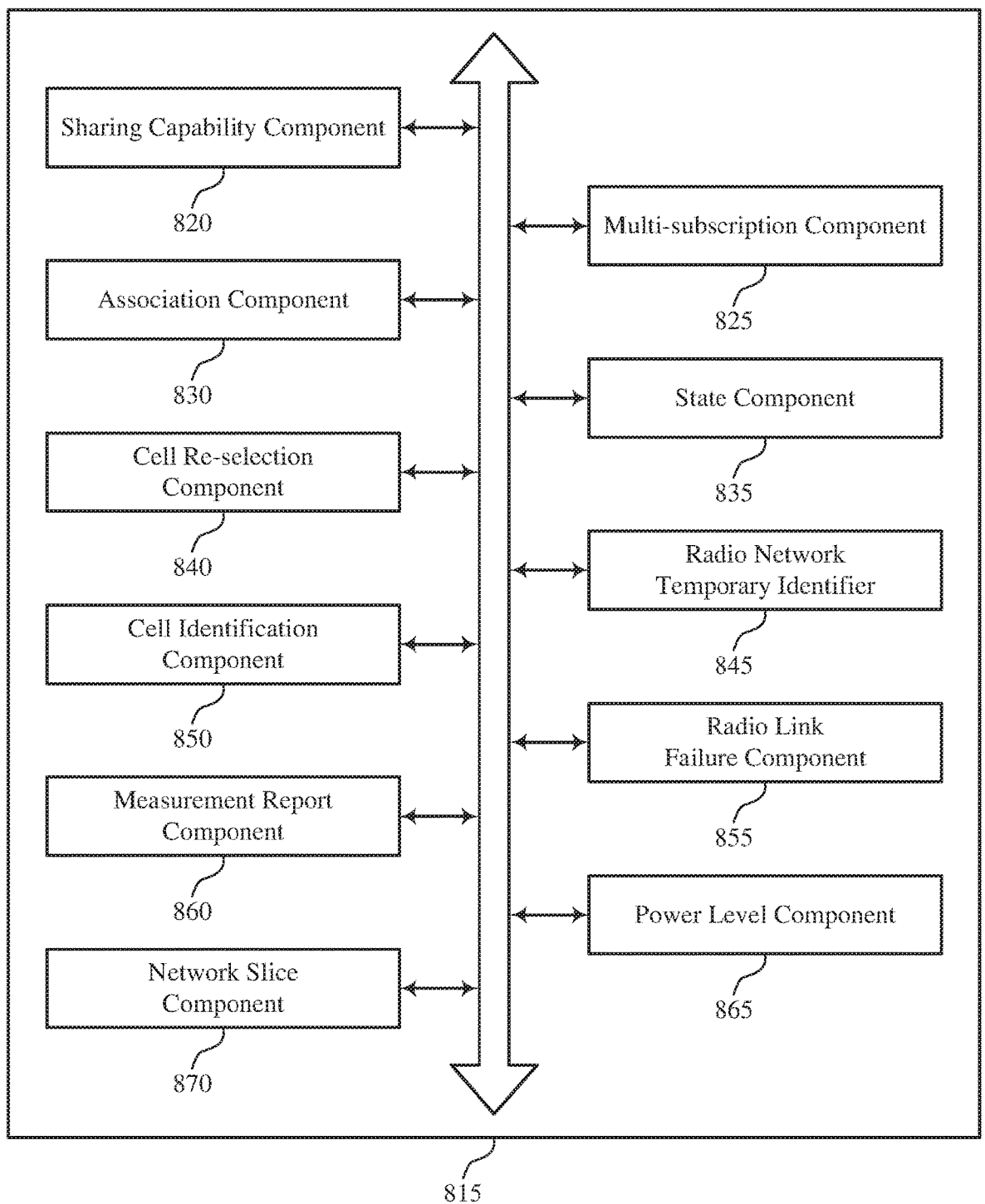

FIG. 8 shows a block diagram 800 of a UE communication manager 815 that supports network assisted multi-subscription physical layer sharing, in accordance with one or more aspects of the present disclosure. The UE communication manager 815 may be an example of aspects of a UE communication manager 615, a UE communication manager 715, or a UE communication manager 915 described with reference to FIGS. 6, 7, and 9. The UE communication manager 815 may include sharing capability component 820, multi-subscription component 825, association component 830, state component 835, cell re-selection component 840, radio network temporary identifier 845, cell identification component 850, radio link failure component 855, measurement report component 860, power level component 865, and network slice component 870. Each of these modules may communicate, directly or indirectly, with one another (e.g., via one or more buses).

Sharing capability component 820 may transmit, via one or more radios on a UE (e.g., wireless device 605, 705, or 805), a physical layer sharing capability indication to a network. In some cases, the physical layer sharing capability indication is based on performing radio link management measurements.

Multi-subscription component 825 may transmit multi-subscription coordination capability to the network. In some examples, the multi-subscription may be capable of being concurrently in an active state based on the transmitted physical layer sharing capability indication and the transmitted multi-subscription coordination capability. In some examples, multi-subscription component 825 may identify a first serving cell of a first SIM based on the multi-subscription coordination capability indication. Multi-subscription component 825 may also identify a second serving cell of the second SIM based on the multi-subscription coordination capability. In some cases, multi-subscription component 825 may identify a request for multi-subscription operation. The multi-subscription coordination capability may be transmitted to the network based on the identifying.

In some examples, multi-subscription component 825 may establish a communication link between a first SIM and the first serving cell, Multi-subscription component 825 may determine that a serving cell of the second STM is different than the first serving cell, and determine that the first serving cell of the first SIM is different from the second serving cell of the second SIM. In some cases, the SIM includes at least one of a unique subscriber identifier (ID), a security key, one or more additional parameters, or a combination thereof. In some cases, wireless device 605, 705, or 905 may include a multi-SIM having at least two SIMs associated with a shared RF resource. In some cases, the multi-subscriber SIM is associated with a single operator. In some cases, at least one of schedule data, control channel, or a combination thereof is configured on a same or different TTI. In some cases, the multi-subscription coordination capability includes at least one of a SIM, a USIM, a CSIM, a ULM, a soft SIM, a credential, or a combination thereof.

Association component 830 may associate the physical layer sharing capability indication with the at least two SIMs and transmit a SIM association indication to the same serving cell based on the determining. State component 835 may determine that a first SIM of the at least two SIMs is in a RRC connected state. In some examples, state component 835 may determine that a second SIM of the at least two SIMs is in a RRC idle state, and determine that the second SIM of the at least two SIMs is in the RRC connected state.

Cell re-selection component 840 may trigger cell reselection to a first serving cell for the second SIM based on the determining. Cell re-selection component 840 may initiate an RRC connection between the second SIM and the first serving cell based on triggering the cell reselection. In some cases, cell re-selection component 840 may initiate an RRC connection setup phase between the second SIM and the first serving cell. In some examples, cell re-selection component 840 may transmit subscription information associated with the second SIM to a network. Radio network temporary identifier 845 may assign and/or receive a first RNTI of the first serving cell based on the establishing and assign and/or receive a second RNTI to the second SIM. Additionally or alternatively, cell identification component 850 may determine that first SIM and the second SIM are in the RRC connected state with a same serving cell.

Radio link failure component 855 may perform RLF measurement using at least one of the two SIMs. In some examples, radio link failure component 855 may detect RLF based on the performed RLF measurement, and perform RLF recovery on both of the two SIMs based on the detected RLF. In some cases, radio link failure component 855 may perform RLF recovery on at least one of the two SIMs based on a detected RLF of a communication link associated with at least one of the two SIM, or bath of the two SIMs.

Measurement report component 860 may transmit measurement reports using a same or different TTI. In some cases, at least one SIM of the two SIMs is configured to perform RRM measurement. In some cases, at least one SIM of the two SIMs is configured to perform CSI measurement. In some cases, at least one SIM of the two SIMs is configured to PHR measurement. In some cases, at least two SIMs are configured to transmit measurement reports using a same or different TTI. In some cases, the measurement reports includes at least one of a RRM measurement, CSI measurement, PHR measurement, or a combination thereof. Power level component 865 may determine concurrent transmission of data or control information via the at least two SIMs during a same TTI, configure a power level of the UE based on the determining, and proportionally distribute transmission power level to the at least two SIMs.

Network slice component 870 may identify that a first SIM of the at least two SIMs is associated with a first network slice and a second SIM of the at least two SIMs is associated with a second network slice. In some cases, the first network slice and the second network slice may be different. In some cases, the first network slice may be associated with a first signaling connection and the second network slice is associated with a second signaling connection. In some cases, the first signaling connection may be independent of the second signaling connection. The first network slice may be associated with a first CNF and a first AMF. Additionally or alternatively, the second network slice may be associated with a second CNF and a second AMF. In some cases, the first network slice and the second network slice share a CCNF. In some cases, the shared CCNF may include at least one of a AMF, a signaling connection, or a combination thereof.

Figure 9:
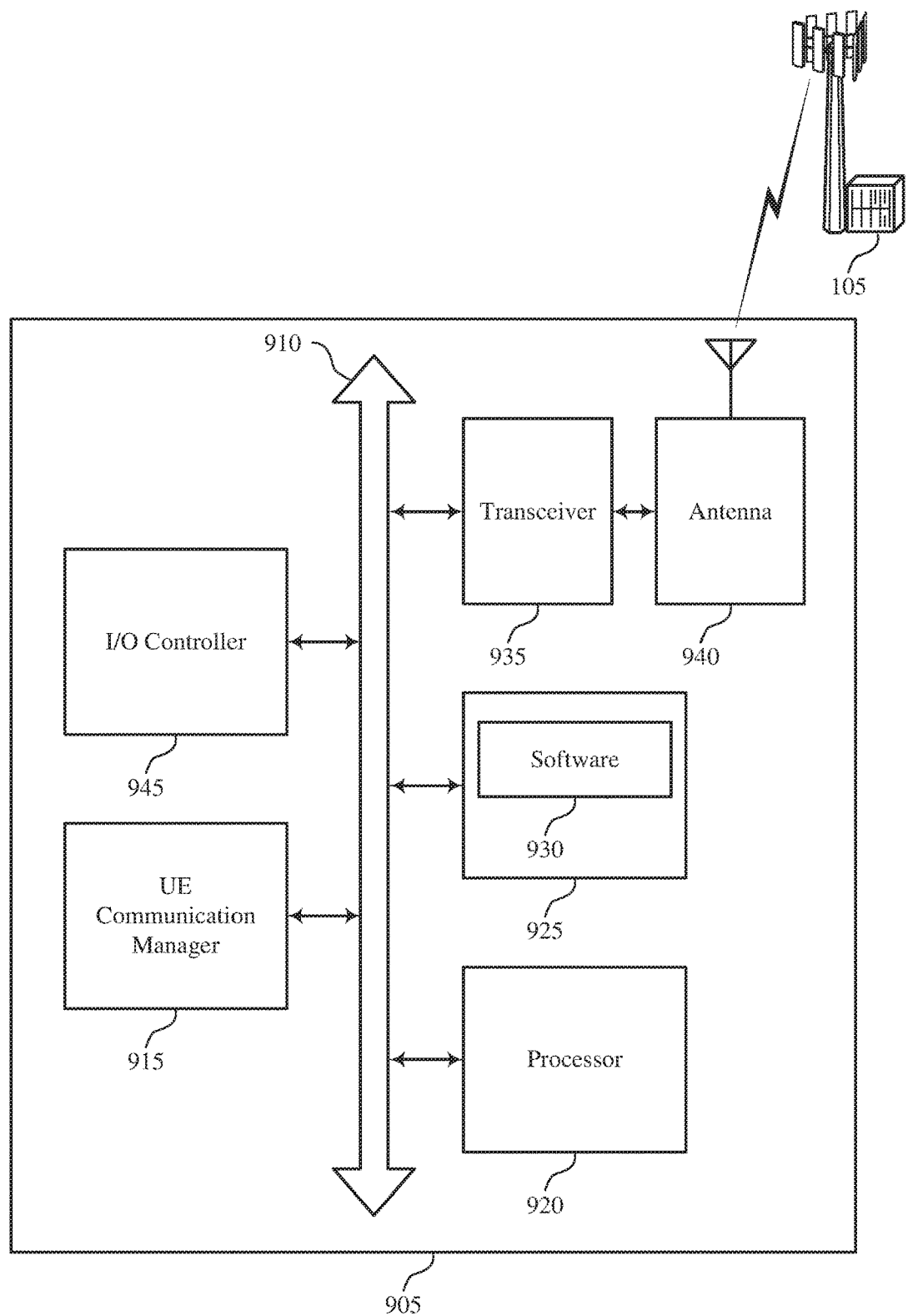
FIG. 9 illustrates a block diagram of a system including a UE that supports network assisted multi-subscription physical layer sharing, in accordance with one or more aspects of the present disclosure.

FIG. 9 shows a diagram of a system 900 including a device 905 that supports network assisted multi-subscription physical layer sharing, in accordance with one or more aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE communication manager 915, processor 920, memory 925, software 930, transceiver 935, antenna 940, and I/O controller 945. These components may be in electronic communication via one or more busses (e.g., bus 910). Device 905 may communicate wirelessly with one or more network access devices 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting network assisted multi-subscription physical layer sharing).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support network assisted multi-subscription physical layer sharing. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
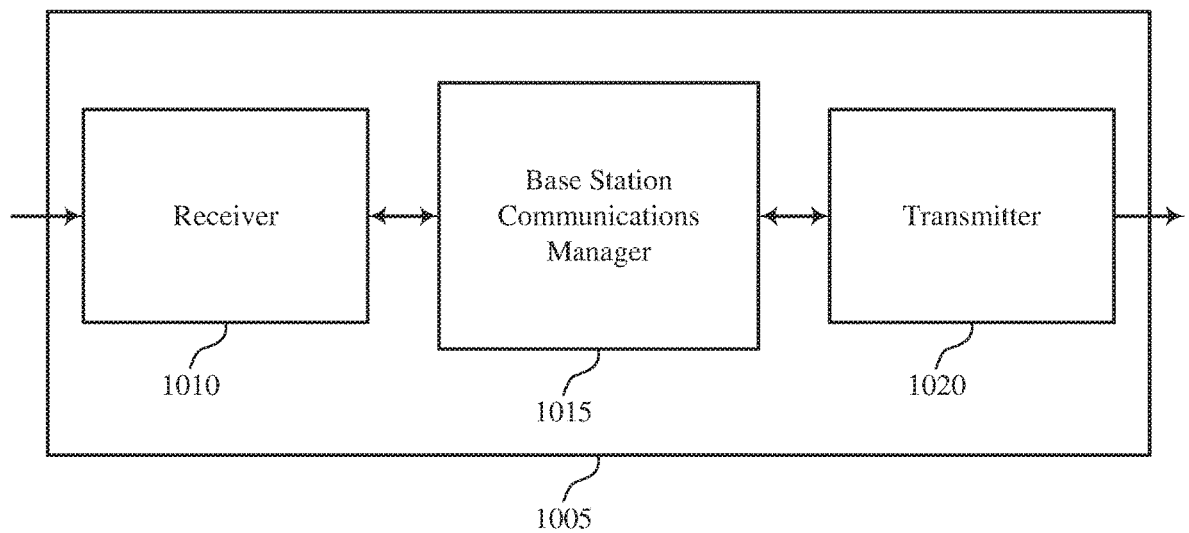
FIGS. 10 through 12 show block diagrams of a device that supports network assisted multi-subscription physical layer sharing, in accordance with one or more aspects of the present disclosure.

FIG. 10 shows a block diagram 1000 of a wireless device 1005 that supports network assisted multi-subscription physical layer sharing, in accordance with one or more aspects of the present disclosure. Wireless device 1005 may be an example of aspects of a base station 105 as described with reference to FIG. 1. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to network assisted multi-subscription physical layer sharing, etc.). Information may be passed on to other components of the device. In some examples, receiver 1010 may receive from a first SIM identity information associated with ae UE and receive from a second SIM identity information associated with the UE. The receiver 1010 may be an example of aspects of the transceiver 1335 described with reference to FIG. 13.

Base station communications manager 1015 may be an example of aspects of the network communication manager 101 described with reference to FIG. 1. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. Base station communications manager 1015 may receive a physical layer sharing capability indication from a UE and receive multi-subscription coordination capability from the UE.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
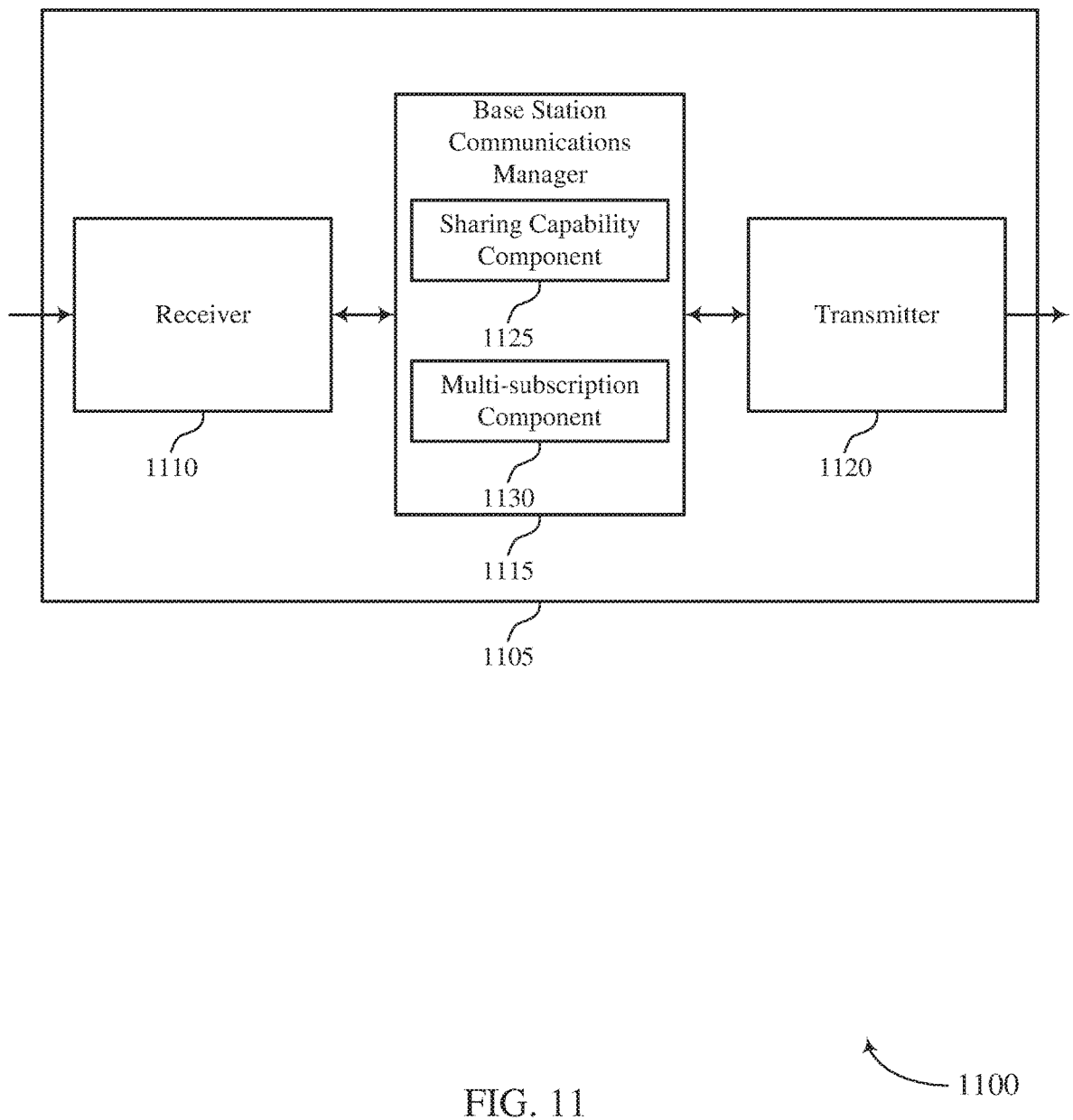

FIG. 11 shows a block diagram 1100 of a wireless device 1105 that supports network assisted multi-subscription physical layer sharing, in accordance with one or more aspects of the present disclosure. Wireless device 1105 may be an example of aspects of a wireless device 1105 or a base station 105 as described with reference to FIGS. 1 and 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to network assisted multi-subscription physical layer sharing, etc.). Information may be passed on to other components of the device. The receiver 1110 may be an example of aspects of the transceiver 1335 described with reference to FIG. 13.

Base station communications manager 1115 may be an example of aspects of the base station communications manager 1015 described with reference to FIG. 10. Base station communications manager 1115 may also include sharing capability component 1125 and multi-subscription component 1130. In some cases, sharing capability component 1125 may receive a physical layer sharing capability indication from a UE (e.g., UEs 115). In some cases, the physical layer sharing capability indication is associated with at least two SIMS. Multi-subscription component 1130 may receive multi-subscription coordination capability from the UE.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
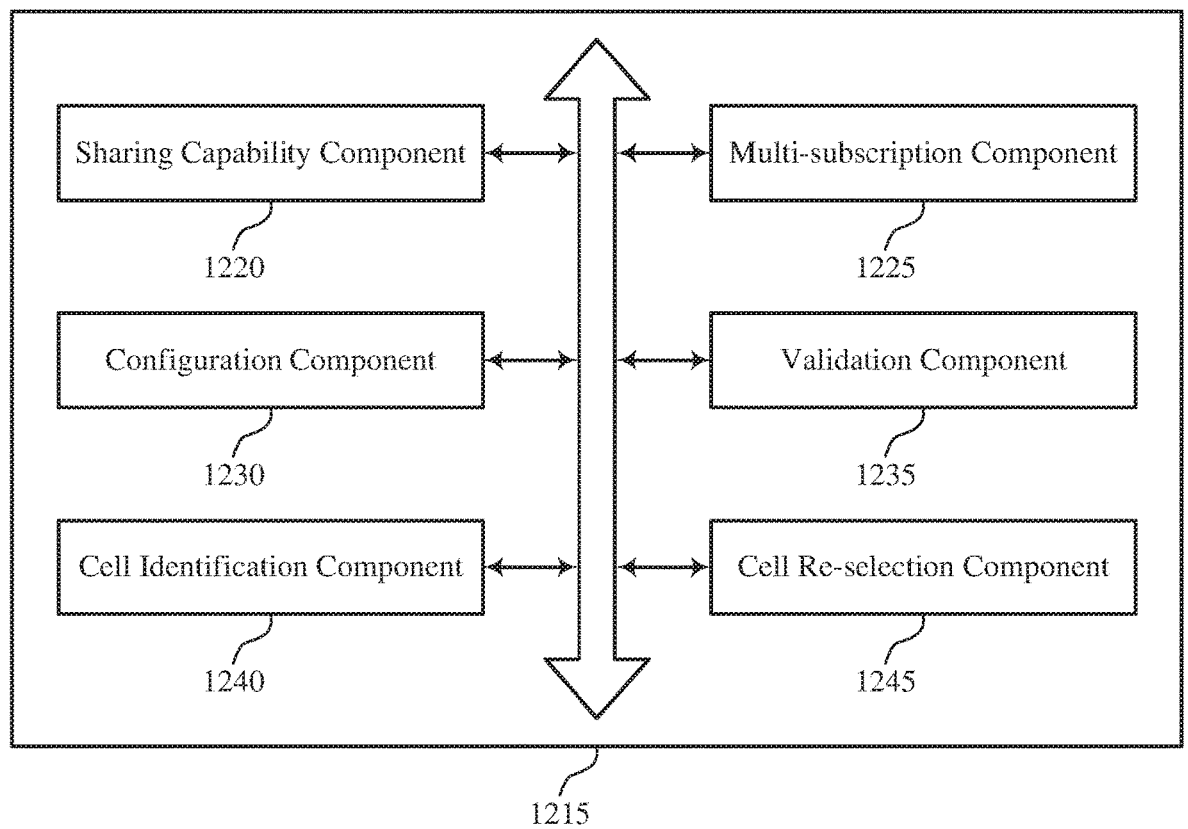

FIG. 12 shows a block diagram 1200 of a base station communications manager 1215 that supports network assisted multi-subscription physical layer sharing, in accordance with one or more aspects of the present disclosure. The base station communications manager 1215 may be an example of aspects of a base station communications manager 1215 described with reference to FIGS. 10, 11, and 13. The base station communications manager 1215 may include sharing capability component 1220, multi-subscription component 1225, configuration component 1230, validation component 1235, cell identification component 1240, and cell re-selection component 1245. Each of these modules may communicate, directly or indirectly, with one another (e.g., via one or more buses).

Sharing capability component 1220 may receive a physical layer sharing capability indication from a UE. In some cases, the physical layer sharing capability indication is associated with at least two SIMs. Multi-subscription component 1225 may receive multi-subscription coordination capability from a UE.

Configuration component 1230 may configure PHR measurements and reporting for the at least two SIMs. In some examples, configuration component 1230 may configure CSI measurements and reporting for the at least two SIMs. Configuration component 1230 may, additionally or alternatively, configure peak to average power ratio measurements and report the average power ratio measurements for the at least two SIMs.

Validation component 1235 may compare identity information received from a first SIM and a second SIM of the at least two SINK In some examples, validation component 1235 may validate the identity information based on the comparison. In some cases, validation component 1235 may compare the received identity information from the first SIM and the second SIM with an identity of one or more UE registered in a home subscriber server database.

Cell identification component 1240 may determine that a first SIM of the at least two SIMs is connected with a first serving cell. Additionally, in some examples, cell identification component 1240 may determine that a second SIM of the at least two SIMs is connected with a second serving cell. The cell identification component 1240 may determine that the first serving cell and the second serving cell are different.

Cell re-selection component 1245 may trigger cell reselection to the first serving cell for the second SIM based on determining the difference. In some cases, the cell reselection to the first serving cell for the second SIM is based on a carrier aggregation configuration. In some cases, the cell reselection to the first serving cell for the second SIM is based on a dual connectivity configuration. In some cases, the cell reselection to the first serving cell for the second SIM is based on a master cell group or a secondary cell group configuration.

Figure 13:
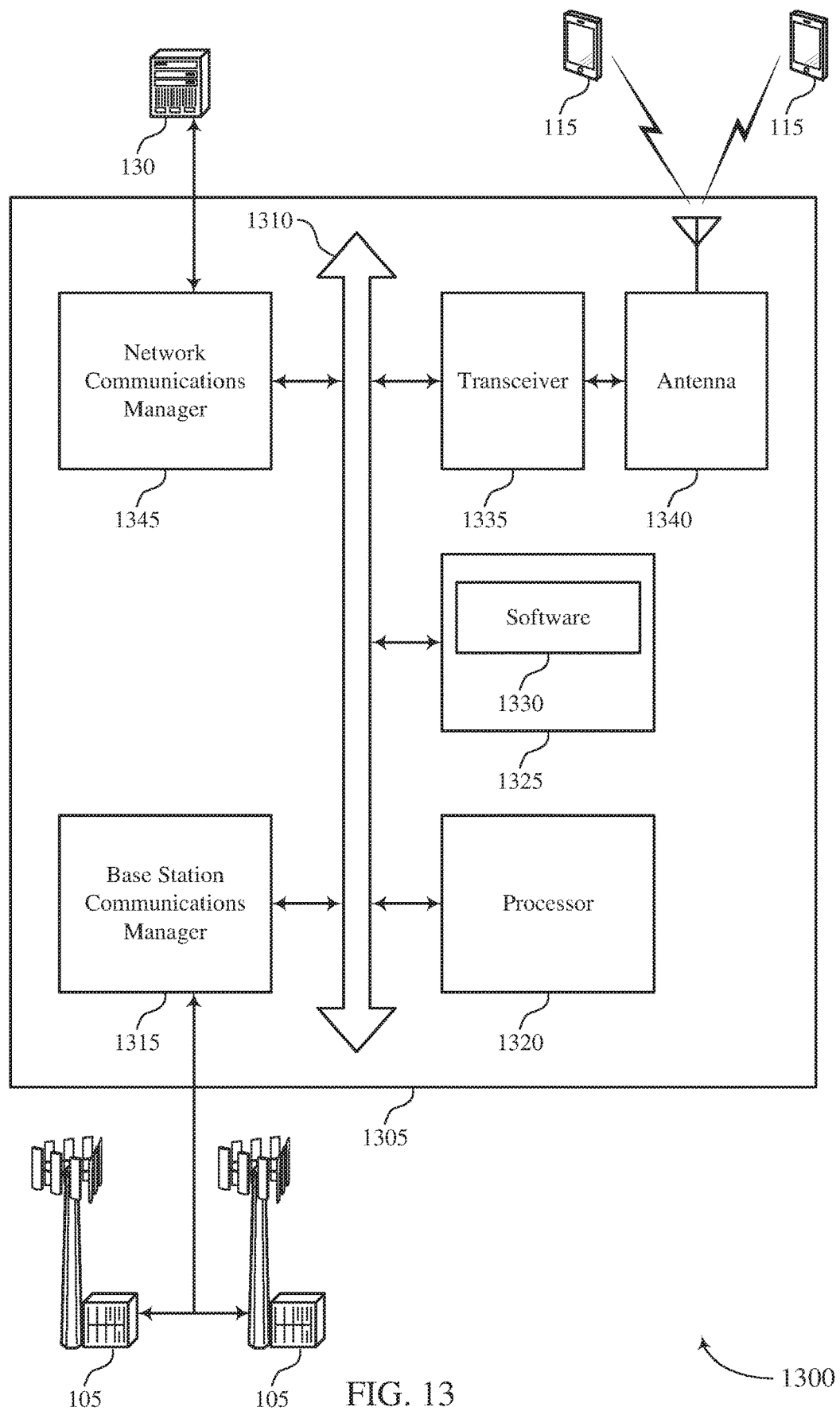
FIG. 13 illustrates a block diagram of a system including a base station that supports network assisted multi-subscription physical layer sharing, in accordance with one or more aspects of the present disclosure.

FIG. 13 shows a diagram of a system 1300 including a device 1305 that supports network assisted multi-subscription physical layer sharing, in accordance with one or more aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, and network communications manager 1345. These components may be in electronic communication via one or more busses (e.g., bus 1310). Device 1305 may communicate wirelessly with one or more UEs 115.

Base station communications manager 1315 may manage communications with other network access devices 105, and may include a controller or scheduler for controlling communications with UEs 115 in cooperation with other network access devices 105. For example, the base station communications manager 1315 may coordinate scheduling for transmissions to UEs 115 for various interference mitigation techniques such as beamforming or joint transmission. In some examples, base station communications manager 1315 may provide an X2 interface within an LTE/LTE-A wireless communication network technology to provide communication between network access devices 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting network assisted multi-subscription physical layer sharing).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support network assisted multi-subscription physical layer sharing. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the CN (e.g., via one or more wired backhaul links). For example, the network communications manager 1345 may manage the transfer of data communications for client devices, such as one or more UEs 115.

Figure 14:
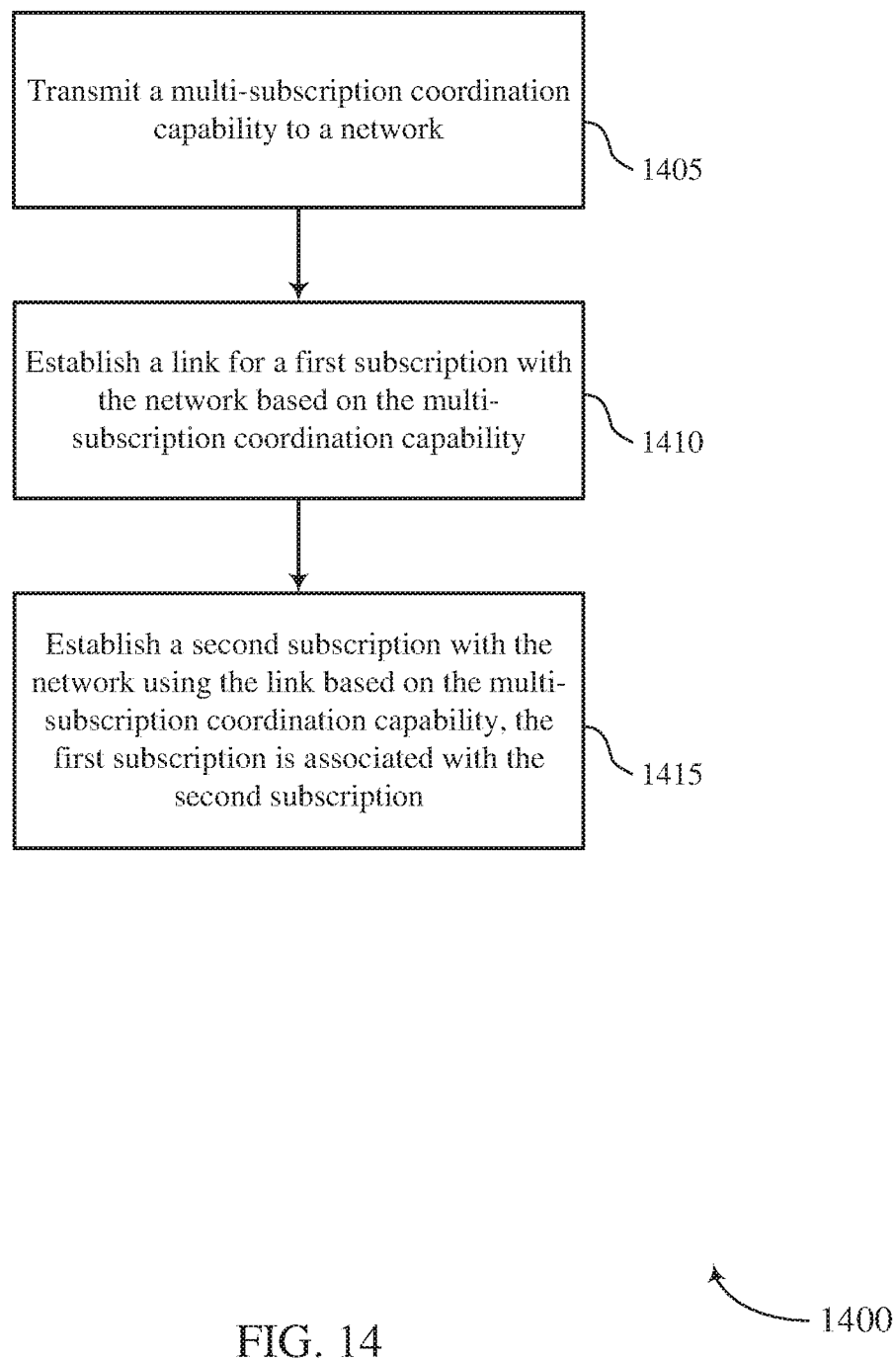
FIGS. 14 through 21 illustrate methods for network assisted multi-subscription physical layer sharing, in accordance with one or more aspects of the present disclosure.

FIG. 14 shows a flowchart illustrating a method 1400 for network assisted multi-subscription physical layer sharing, in accordance with one or more aspects of the present disclosure. The operations of method 1400 may be implemented by a UE 115 or its components as described herein. For example, the operations of method 1400 may be performed by a UE communication manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405, the UE 115 may transmit multi-subscription coordination capability to a network. The operations of block 1405 may be performed according to the methods described with reference to FIGS. 6 through 9. In certain examples, aspects of the operations of block 1405 may be performed by a sharing capability component as described with reference to FIGS. 6 through 9.

At block 1410, the LIE 115 may establish a link for a first subscription with the network based on the multi-subscription coordination capability. In some cases, the multi-subscription coordination capability may be indicative of UEs capability of being concurrently in an active state based on the transmitted physical layer sharing capability indication and the transmitted multi-subscription coordination capability. The operations of block 1410 may be performed according to the methods described with reference to FIGS. 6 through 9. In certain examples, aspects of the operations of block 1410 may be performed by a multi-subscription component as described with reference to FIGS. 7 through 8.

At block 1415, the UE 115 may establish a second subscription with the network using the link based on the multi-subscription coordination capability. In some cases, the first subscription is associated with the second subscription. The operations of block 1415 may be performed according to the methods described with reference to FIGS. 6 through 9. In certain examples, aspects of the operations of block 1415 may be performed by a multi-subscription component as described with reference to FIGS. 7 through 8.

Figure 15:
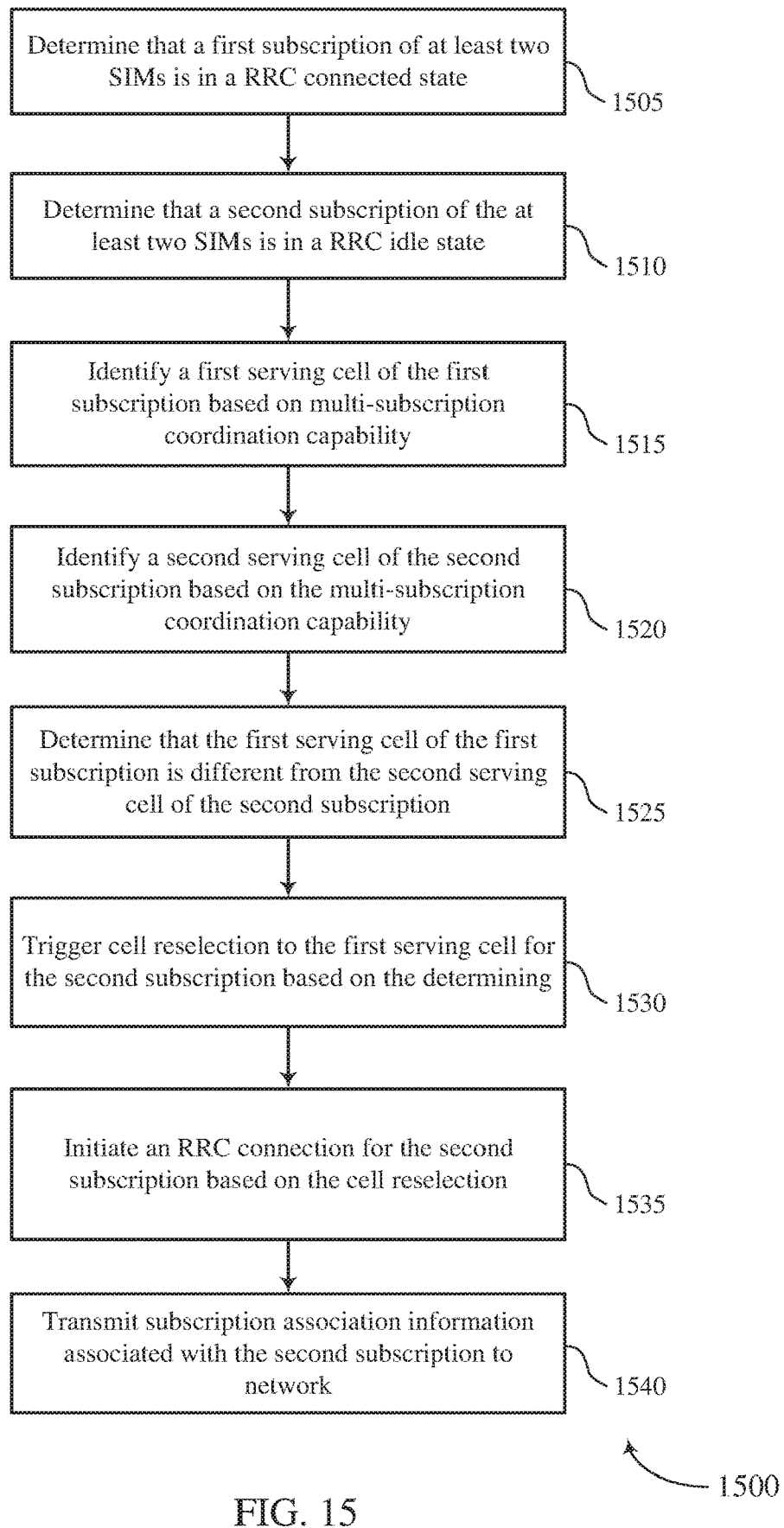

FIG. 15 shows a flowchart illustrating a method 1500 for network assisted multi-subscription physical layer sharing, in accordance with one or more aspects of the present disclosure. The operations of method 1500 may be implemented by a UE 115 or its components as described herein. For example, the operations of method 1500 may be performed by a UE communication manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505, the UE 115 may determine that a first subscription of at least two SIMS is in a RRC connected state. The operations of block 1505 may be performed according to the methods described with reference to FIGS. 6 through 9. In certain examples, aspects of the operations of block 1505 may be performed by a state component as described with reference to FIG. 8.

At block 1510, the UE 115 may determine that a second subscription of the at least two SIMS is in a RRC idle state. The operations of block 1510 may be performed according to the methods described with reference to FIGS. 6 through 9. In certain examples, aspects of the operations of block 1510 may be performed by a state component as described with reference to FIG. 8.

At block 1515, the UE 115 may identify a first serving cell of the first subscription based on multi-subscription coordination capability. The operations of block 1515 may be performed according to the methods described with reference to FIGS. 6 through 9. In certain examples, aspects of the operations of block 1515 may be performed by a multi-subscription component as described with reference to FIGS. 7 through 8.

At block 1520, the UE 115 may identify a second serving cell of the second subscription based on the multi-subscription coordination capability. The operations of block 1520 may be performed according to the methods described with reference to FIGS. 6 through 9. In certain examples, aspects of the operations of block 1520 may be performed by a multi-subscription component as described with reference to FIGS. 7 through 8.

At block 1525, the UE 115 may determine that the first serving cell of the first subscription is different from the second serving cell of the second subscription. The operations of block 1525 may be performed according to the methods described with reference to FIGS. 6 through 9. In certain examples, aspects of the operations of block 1525 may be performed by a multi-subscription component as described with reference to FIGS. 7 through 8.

At block 1530, the UE 115 may trigger cell reselection to the first serving cell for the second subscription based on the determining. The operations of block 1530 may be performed according to the methods described with reference to FIGS. 6 through 9. In certain examples, aspects of the operations of block 1530 may be performed by a cell re-selection component as described with reference to FIG. 8.

At block 1535, the UE 115 may initiate an RRC connection for the second subscription based on the cell reselection. The operations of block 1535 may be performed according to the methods described with reference to FIGS. 6 through 9. In certain examples, aspects of the operations of block 1535 may be performed by a cell re-selection component as described with reference to FIG. 8.

At block 1540, the UE 115 may transmit subscription association information associated with the second subscription to a network (e.g., CN 130). The operations of block 1540 may be performed according to the methods described with reference to FIGS. 6 through 9. In certain examples, aspects of the operations of block 1540 may be performed by a cell re-selection component as described with reference to FIG. 8.

Figure 16:
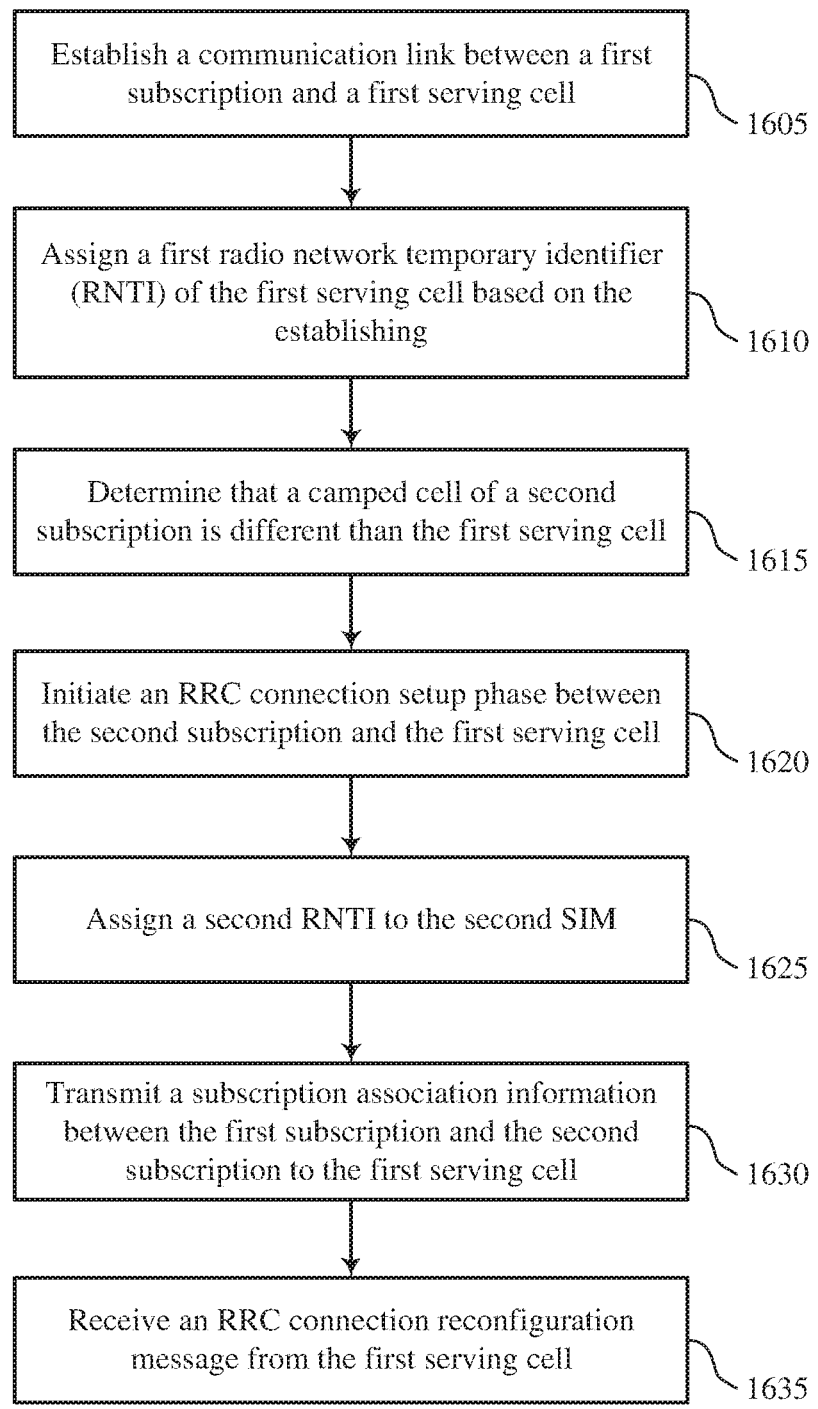

FIG. 16 shows a flowchart illustrating a method 1600 for network assisted multi-subscription physical layer sharing, in accordance with one or more aspects of the present disclosure. The operations of method 1600 may be implemented by a UE 115 or its components as described herein. For example, the operations of method 1600 may be performed by a UE communication manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605, the UE 115 may establish a communication link between the first subscription and the first serving cell. In some cases, UE 115 may include a multi-subscriber SIM having at least two SIMS. The operations of block 1605 may be performed according to the methods described with reference to FIGS. 6 through 9, In certain examples, aspects of the operations of block 1605 may be performed by a multi-subscription component as described with reference to FIGS. 7 through 8.

At block 1610, the UE 115 may assign a first RNTI of the first serving cell based on the establishing. The operations of block 1610 may be performed according to the methods described with reference to FIGS. 6 through 9. In certain examples, aspects of the operations of block 1610 may be performed by a radio network temporary identifier as described with reference to FIG. 8.

At block 1615, the UE 115 may determine that a serving cell of the second subscription is different than the first serving cell. The operations of block 1615 may be performed according to the methods described with reference to FIGS. 6 through 9. In certain examples, aspects of the operations of block 1615 may be performed by a multi-subscription component as described with reference to FIGS. 7 through 8.

At block 1620, the UE 115 may initiate an RRC connection setup phase between the second subscription and the first serving cell. The operations of block 1620 may be performed according to the methods described with reference to FIGS. 6 through 9. In certain examples, aspects of the operations of block 1620 may be performed by a cell re-selection component as described with reference to FIG. 8.

At block 1625, the UE 115 may assign a second RNTI to the second subscription. The operations of block 1625 may be performed according to the methods described with reference to FIGS. 6 through 9. In certain examples, aspects of the operations of block 1625 may be performed by a radio network temporary identifier as described with reference to FIG. 8.

At block 1630, the UE 115 may transmit subscription association information between the first subscription and the second subscription to the first serving cell. The operations of block 1630 may be performed according to the methods described with reference to FIGS. 6 through 9. In certain examples, aspects of the operations of block 1630 may be performed by a transmitter as described with reference to FIGS. 6, 7, and 9.

At block 1635, the UE 115 may receive an RRC connection reconfiguration message from the first serving cell. The operations of block 1635 may be performed according to the methods described with reference to FIGS. 6 through 9. In certain examples, aspects of the operations of block 1635 may be performed by a receiver as described with reference to FIGS. 6, 7, and 9.

Figure 17:
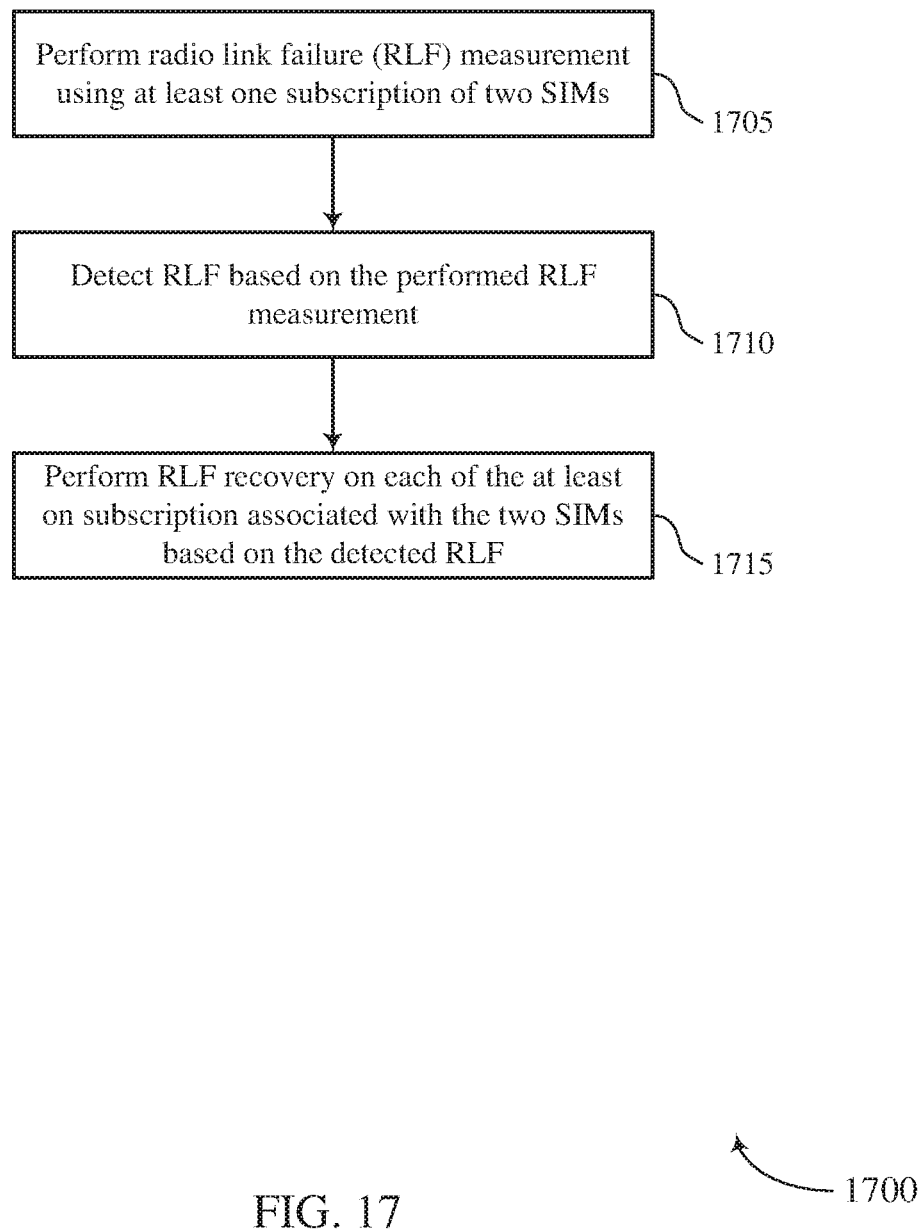

FIG. 17 shows a flowchart illustrating a method 1700 for network assisted multi-subscription physical layer sharing, in accordance with one or more aspects of the present disclosure. The operations of method 1700 may be implemented by a UE 115 or its components as described herein. For example, the operations of method 1700 may be performed by a UE communication manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1705, the UE 115 may perform RLF measurement using at least one subscription of two SIMS. In some cases, UE 115 may include a multi-subscriber SIM having the at least two SIMs. The operations of block 1705 may be performed according to the methods described with reference to FIGS. 6 through 9. In certain examples, aspects of the operations of block 1705 may be performed by a radio link failure component as described with reference to FIG. 8.

At block 1710, the UE 115 may detect RLF based on the performed RLF measurement. The operations of block 1710 may be performed according to the methods described with reference to FIGS. 6 through 9. In certain examples, aspects of the operations of block 1710 may be performed by a radio link failure component as described with reference to FIG. 8.

At block 1715, the UE 115 may perform RLF recovery on each of the at least on subscription associated with the two SIMs based on the detected RLF. The operations of block 1715 may be performed according to the methods described with reference to FIGS. 6 through 9. In certain examples, aspects of the operations of block 1715 may be performed by a radio link failure component as described with reference to FIG. 8.

Figure 18:
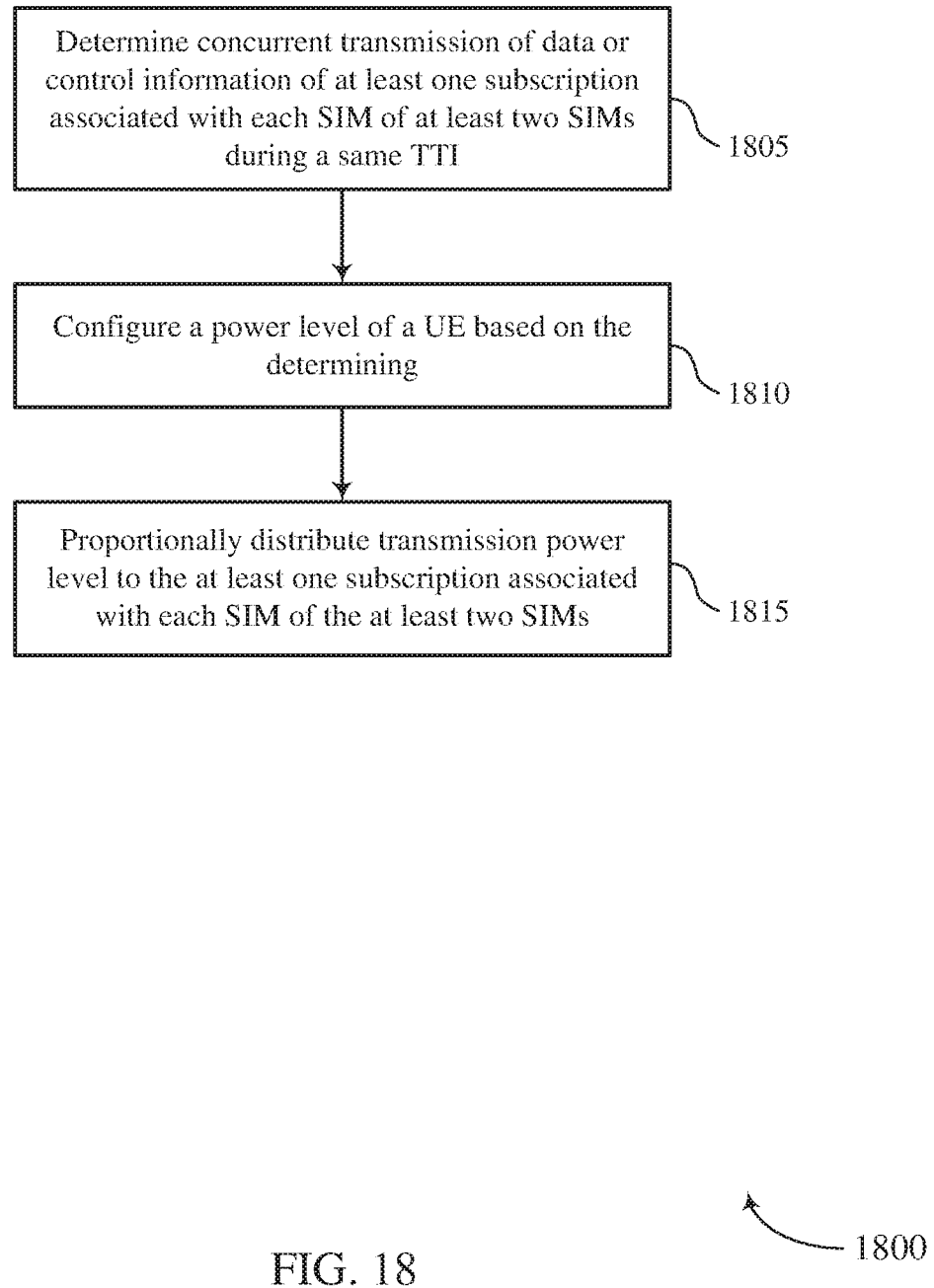

FIG. 18 shows a flowchart illustrating a method 1800 for network assisted multi subscription physical layer sharing, in accordance with one or more aspects of the present disclosure. The operations of method 1800 may be implemented by a UE 115 or its components as described herein. For example, the operations of method 1800 may be performed by a UE communication manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1805, the UE 115 may determine concurrent transmission of data or control information of the at least one subscription associated with each SIM of the at least two SIMs during a same TTI. In some cases, UE 115 may include a SIM having at the least two SIMs. In some examples, each of the at least two SIM maybe associated with at least one subscription. The operations of block 1805 may be performed according to the methods described with reference to FIGS. 6 through 9. In certain examples, aspects of the operations of block 1805 may be performed by a power level component as described with reference to FIG. 8.

At block 1810, the UE 115 may configure a power level of the UE based on the determining. The operations of block 1810 may be performed according to the methods described with reference to FIGS. 6 through 9. In certain examples, aspects of the operations of block 1810 may be performed by a power level component as described with reference to FIG. 8.

At block 1815, the UE 115 may proportionally distribute transmission power level to the at least one subscription associated with each SIM of the at least two SIMs. The operations of block 1815 may be performed according to the methods described with reference to FIGS. 6 through 9. In certain examples, aspects of the operations of block 1815 may be performed by a power level component as described with reference to FIG. 8.

Figure 19:
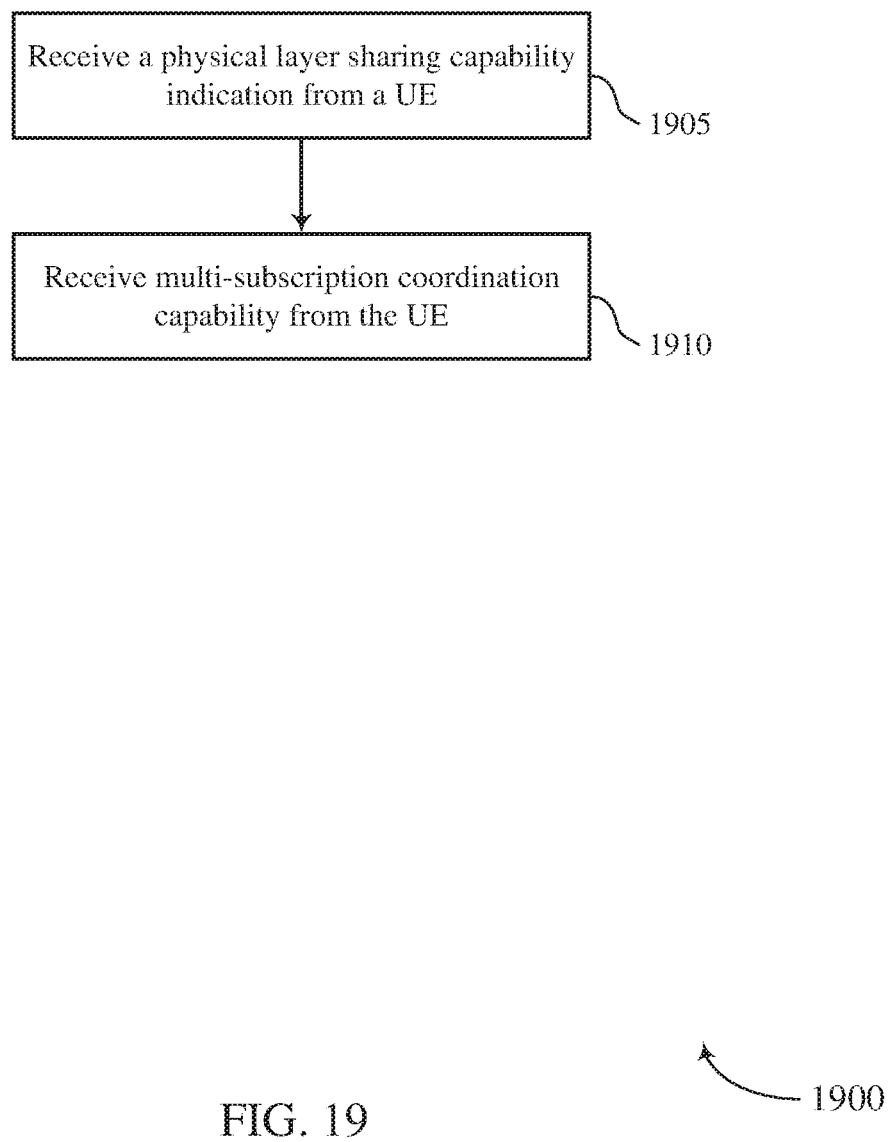

FIG. 19 shows a flowchart illustrating a method 1900 for network assisted multi-subscription physical layer sharing, in accordance with one or more aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1905, the base station 105 may receive a physical layer sharing capability indication from a UE. The operations of block 1905 may be performed according to the methods described with reference to FIGS. 10 through 13. In certain examples, aspects of the operations of block 1905 may be performed by a sharing capability component as described with reference to FIGS. 11 through 12.

At block 1910, the base station 105 may receive multi-subscription coordination capability from the UE. The operations of block 1910 may be performed according to the methods described with reference to FIGS. 11 through 12. In certain examples, aspects of the operations of block 1910 may be performed by a multi-subscription component as described with reference to FIGS. 11 through 12.

Figure 20:
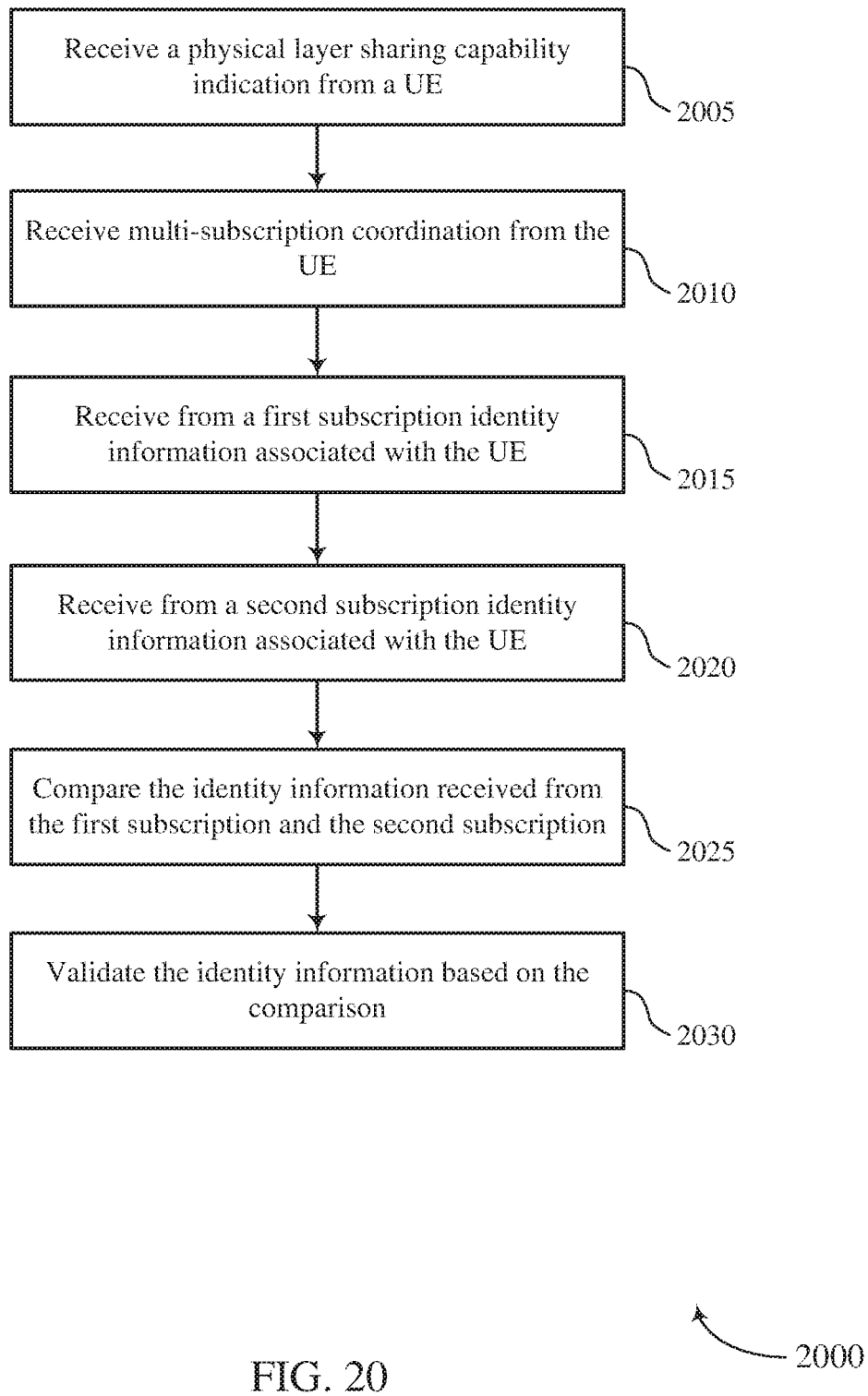

FIG. 20 shows a flowchart illustrating a method 2000 for network assisted multi-subscription physical layer sharing, in accordance with one or more aspects of the present disclosure. The operations of method 2000 may be implemented by a base station 105 or its components as described herein. For example, the operations of method 2000 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 2005, the base station 105 may receive a physical layer sharing capability indication from a UE. The operations of block 2005 may be performed according to the methods described with reference to FIGS. 10 through 13. In certain examples, aspects of the operations of block 2005 may be performed by a sharing capability component as described with reference to FIGS. 11 through 12.

At block 2010, the base station 105 may receive multi-subscription coordination capability from the UE. The operations of block 2010 may be performed according to the methods described with reference to FIGS. 10 through 13. In certain examples, aspects of the operations of block 2010 may be performed by a multi-subscription component as described with reference to FIGS. 11 through 12.

At block 2015, the base station 105 may receive from a first subscription identity information associated with the UE. The operations of block 2015 may be performed according to the methods described with reference to FIGS. 10 through 13. In certain examples, aspects of the operations of block 2015 may be performed by a receiver as described with reference to FIGS. 10, 11, and 13.

At block 2020, the base station 105 may receive from a second subscription identity information associated with the UE. The operations of block 2020 may be performed according to the methods described with reference to FIGS. 10 through 13. In certain examples, aspects of the operations of block 2020 may be performed by a receiver as described with reference to FIGS. 10, 11, and 13.

At block 2025, the base station 105 may compare the identity information received from the first subscription and the second subscription. The operations of block 2025 may be performed according to the methods described with reference to FIGS. 10 through 13. In certain examples, aspects of the operations of block 2025 may be performed by a validation component as described with reference to FIG. 12.

At block 2030, the base station 105 may validate the identity information based on the comparison. The operations of block 2030 may be performed according to the methods described with reference to FIGS. 10 through 13. In certain examples, aspects of the operations of block 2030 may be performed by a validation component as described with reference to FIG. 12.

Figure 21:
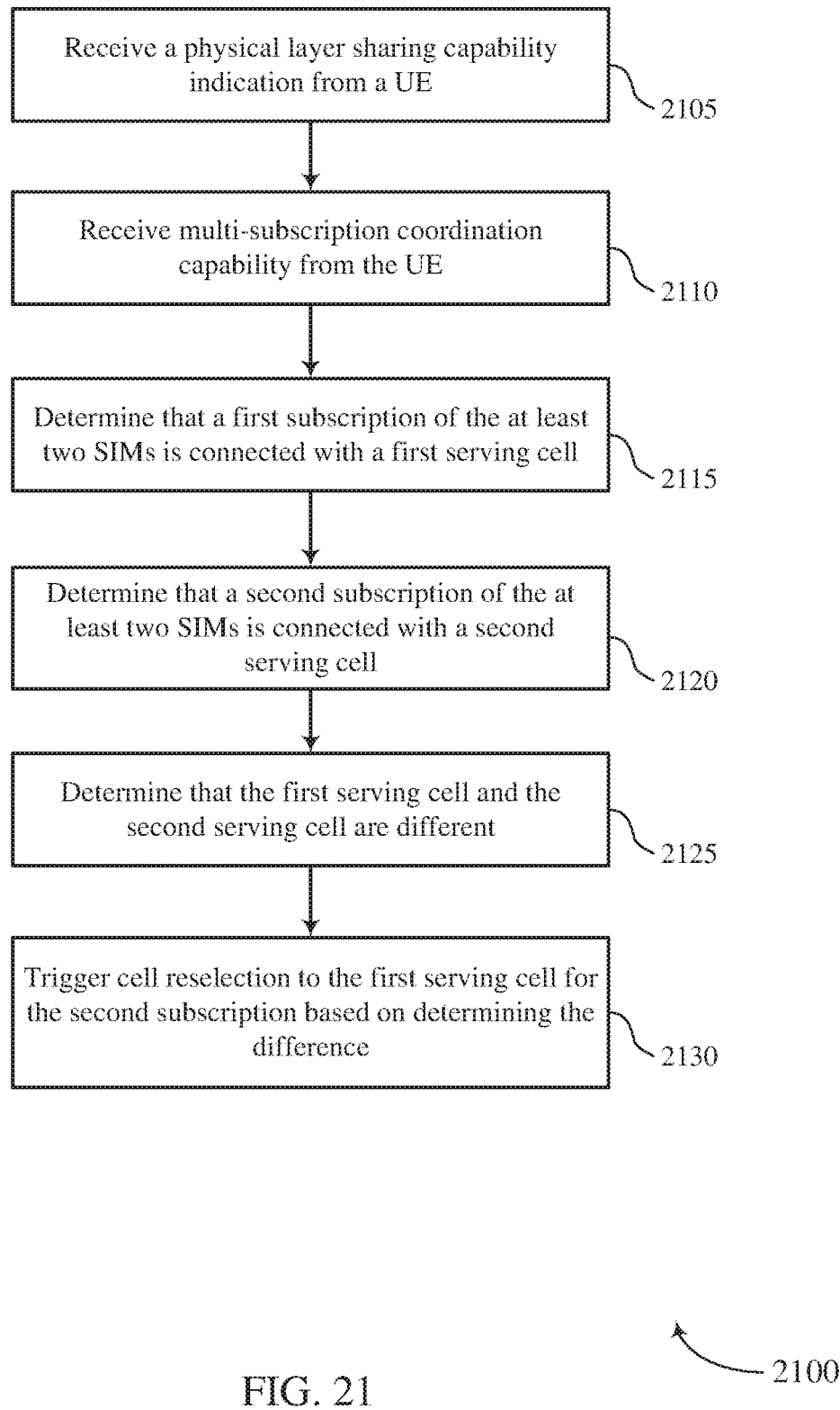

FIG. 21 shows a flowchart illustrating a method 2100 for network assisted multi-subscription physical layer sharing, in accordance with one or more aspects of the present disclosure. The operations of method 2100 may be implemented by a base station 105 or its components as described herein. For example, the operations of method 2100 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 2105, the base station 105 may receive a physical layer sharing capability indication from a UE. The operations of block 2105 may be performed according to the methods described with reference to FIGS. 10 through 13. In certain examples, aspects of the operations of block 2105 may be performed by a sharing capability component as described with reference to FIGS. 11 through 12.

At block 2110, the base station 105 may receive multi-subscription coordination capability from the UE. The operations of block 2110 may be performed according to the methods described with reference to FIGS. 10 through 13. In certain examples, aspects of the operations of block 2110 may be performed by a multi-subscription component as described with reference to FIGS. 11 through 12.

At block 2115, the base station 105 may determine that a first subscription of the at least two SIMs is connected with a first serving cell. The operations of block 2115 may be performed according to the methods described with reference to FIGS. 10 through 13. In certain examples, aspects of the operations of block 2115 may be performed by a cell identification component as described with reference to FIG. 12.

At block 2120, the base station 105 may determine that a second subscription of the at least two SIMs is connected with a second serving cell. The operations of block 2120 may be performed according to the methods described with reference to FIGS. 10 through 13. In certain examples, aspects of the operations of block 2120 may be performed by a cell identification component as described with reference to FIG. 12.

At block 2125, the base station 105 may determine that the first serving cell and the second serving cell are different. The operations of block 2125 may be performed according to the methods described with reference to FIGS. 10 through 13. In certain examples, aspects of the operations of block 2125 may be performed by a cell identification component as described with reference to FIG. 12.

At block 2130, the base station 105 may trigger cell reselection to the first serving cell for the second subscription based on determining the difference. The operations of block 2130 may be performed according to the methods described with reference to FIGS. 10 through 13. In certain examples, aspects of the operations of block 2130 may be performed by a cell re-selection component as described with reference to FIG. 12.

It should be noted that the methods described above describe possible implementations, and that the operations and the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 IX, IX, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein including, for example, wireless communication system 100 and 200 of FIGS. 1 and 2—may include one or more carriers, where each carrier may be a signal made up of multiple sub-carriers e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C), Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to early or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers, Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE) with multi-subscription, the method comprising:
   transmitting a multi-subscription coordination capability to a network;
   establishing a link for a first subscription with the network based at least in part on the multi-subscription coordination capability; and
   establishing a second subscription with the network using the link based at least in part on the multi-subscription coordination capability, the first subscription being associated with a first set of network slices, the second subscription being associated with a second set of network slices, and the first subscription and the second subscription being associated with a same serving cell of the network.

2. The method of claim 1, wherein the first set of network slices and the second set of network slices are different.

3. The method of claim 1, wherein the first set of network slices is associated with a first signaling connection and the second set of network slices is associated with a second signaling connection.

4. The method of claim 1, wherein the first set of network slices is associated with a first control network function (CNF) and a first access and mobility function (AMF), and the second set of network slices is associated with a second control network function (CNF) different from the first CNF and a second AMF different from the first AMF.

5. The method of claim 1, wherein the first set of network slices and the second set of network slices share a common UE radio frequency (RF) and a physical link based at least in part on the multi-subscription coordination capability of the network and the UE.

6. The method of claim 1, wherein a physical layer sharing capability indication is associated with at least the first subscription and the second subscription being associated with the same serving cell.

7. The method of claim 1, wherein the multi-subscription coordination capability comprises at least one of a subscriber identity module (SIM) a universal SIM (USIM), a code division multiple access (CDMA) SIM (CSIM), a user identity module (UIM), a soft SIM, a credential, or a combination thereof.

8. The method of claim 7, wherein the SIM comprises at least one of a unique subscriber identifier (ID), a security key, one or more additional parameters, or a combination thereof.

9. The method of claim 1, further comprising:
transmitting a radio resource control (RRC) message comprising a physical layer sharing capability as part of the multi-subscription coordination capability to the network.

10. The method of claim 9, further comprising:
initiating an RRC connection setup phase for the second subscription;
transmitting subscription association information between the first subscription and the second subscription to a serving call of the first subscription based at least in part on a radio network temporary identifier (RNTI) list comprising at least an RNTI of the first subscription; and
receiving an RRC connection reconfiguration message from the same serving cell with physical layer sharing and at least one multi-subscription parameter.

11. The method of claim 10, wherein transmitting the subscription association information is via at least one of a new information element (IE) in an existing RRC message, or a connection setup complete message, or a new RRC message, or any combination thereof.

12. The method of claim 10, further comprising:
performing a radio resource management (RRM) measurement, or a channel state information (CSI) measurement, or a power headroom (PHR) measurement, or a radio link failure (RLF) measurement, or a combination thereof using at least one subscription based at least in part on the subscription association information.

13. The method of claim 12, wherein the at least one subscription is configured to transmit measurement reports using a transmission time interval (TTI).

14. The method of claim 1, wherein the multi-subscription is associated with a single operator or an indication to the network that multi-subscriptions are associated with a same UE in a same cell.

15. The method of claim 1, further comprising:
triggering a cell reselection to the same serving cell for the second subscription; and
initiating a radio resource control (RRC) connection for the second subscription based at least in part on triggering the cell reselection.

16. The method of claim 1, further comprising:
determining the first subscription and the second subscription are in a radio resource control (RRC) connected state with the same serving cell; and
transmitting a subscription association indication to the same serving cell based at least in part on the determining.

17. The method of claim 1, further comprising:
transmitting, via the first subscription, identity information associated with the UE to the network using at least one of an information element (IE) of a data packet, a radio resource control (RRC) connection message, a dedicated RRC message, or a combination thereof; and
transmitting, via the second subscription, identity information associated with the UE to the network using at least one of the IE of the data packet, the RRC connection message, the dedicated RRC message, or a combination thereof.

18. The method of claim 1, wherein the UE is associated with at least one of a single radio or multiple radios.

19. The method of claim 18, further comprising:
reporting subscription association information of multiple subscriptions associated with the multiple radios of the UE to the network, each radio of the multiple radios is associated with at least one subscription.

20. A method for wireless communication, comprising:
receiving a physical layer sharing capability indication from a user equipment (UE) associated with a first subscription and a second subscription, the first subscription being associated with a first set of network slices, the second subscription being associated with a second set of network slices, and the first subscription and the second subscription being associated with a same serving cell; and
receiving a multi-subscription coordination capability from the UE.

21. The method of claim 20, further comprising:
configuring a power headroom (PHR) measurement, or a channel state information (CSI) measurement, or a peak to average power ratio measurement, or a combination thereof for the UE based at least in part on a subscription association information; and
configuring a reporting of the PHR measurement, or the CSI measurement, or the peak to average power ratio measurement, or the combination thereof for at least one subscription.

22. The method of claim 20, further comprising:
receiving, from the first subscription, identity information associated with the UE;
receiving, from the second subscription, identity information associated with the UE;
comparing the identity information received from the first subscription and the second subscription; and
validating the identity information based at least in part on the comparing.

23. The method of claim 22, further comprising:
comparing the received identity information from the first subscription and the second subscription with an identity of the UE registered in a home subscriber server database.

24. The method of claim 20, further comprising:
triggering cell reselection to the same serving cell for the second subscription.

25. The method of claim 24, wherein the cell reselection to the same serving cell for the second subscription is based at least in part on a carrier aggregation configuration, or a dual connectivity configuration, or a master cell group or a secondary cell group configuration.

26. An apparatus for wireless communication, comprising:
a processor;
memory coupled with the processor; and
a transmitter coupled with the processor and memory, the transmitter configured to:
transmit a multi-subscription coordination capability to a network; and the processor and memory configured to:
establish a link for a first subscription with the network based at least in part on the multi-subscription coordination capability; and
establish a second subscription with the network using the link based at least in part on the multi-subscription coordination capability, the first subscription associated with a first set of network slices, the second subscription associated with a second set of network slices, and the first subscription and the second subscription associated with a same serving cell of the network.

27. The apparatus of claim 26, wherein the first set of network slices and the second set of network slices are different.

28. An apparatus for wireless communication, comprising:
a processor;
memory coupled with the processor; and
a receiver coupled with the processor and memory, the receiver configured to:
receive a physical layer sharing capability indication from a user equipment (UE) associated with a first subscription and a second subscription, the first subscription being associated with a first set of network slices, the second subscription being associated with a second set of network slices, and the first subscription and the second subscription being associated with a same serving cell; and
receive a multi-subscription coordination capability from the UE.

29. The apparatus of claim 28, wherein the processor and the memory are configured to:
configure a power headroom (PHR) measurement, or a channel state information (CSI) measurement, or a peak to average power ratio measurement, or a combination thereof for the UE based at least in part on a subscription association information; and
configure a reporting of the PHR measurement, or the CSI measurement, or the peak to average power ratio measurement or the combination thereof for at least one subscription.

* * * * *